United States Patent [19]
Face, Jr. et al.

[11] Patent Number: 5,814,232
[45] Date of Patent: *Sep. 29, 1998

[54] METHOD OF SEPARATING CONSTITUTENT INGREDIENTS OF MIXTURES BY STAGED RESONANT FREQUENCY VIBRATION

[76] Inventors: Samuel A. Face, Jr.; Glenn F. Rogers, Jr., both of P.O. Box 6389, Norfolk, Va. 23508; Richard P. Bishop, P.O. Box 10495, Burke, Va. 22009; Darrell L. Darrow; Brad Face, both of P.O. Box 6389, Norfolk, Va. 23508

[*] Notice: The term of this patent shall not extend beyond the expiration date of Pat. No. 5,520,862.

[21] Appl. No.: 610,982

[22] Filed: Mar. 5, 1996

Related U.S. Application Data

[63] Continuation-in-part of Ser. No. 160,916, Dec. 3, 1993, Pat. No. 5,520,862.

[51] Int. Cl.⁶ .................................................. C02F 1/00
[52] U.S. Cl. .......................................... 210/739; 210/744
[58] Field of Search ................................ 264/406, 40.1; 210/739, 744, 767

[56] References Cited

U.S. PATENT DOCUMENTS

| | | | |
|---|---|---|---|
| 2,015,217 | 9/1935 | Deniau | 264/69 |
| 2,223,734 | 12/1940 | Mall | 404/116 |
| 2,269,109 | 1/1942 | Jackson | 404/115 |
| 2,293,962 | 8/1942 | Baily | 404/116 |
| 2,332,687 | 10/1943 | Baily | 404/115 |
| 4,579,697 | 4/1986 | Takano | 264/40.1 |
| 4,865,748 | 9/1989 | Morse | 210/739 |

*Primary Examiner*—Christopher A. Fiorilla
*Attorney, Agent, or Firm*—Stephen E. Clark

[57] ABSTRACT

Vibrational energy is introduced into a portion of a liquid-solid work mixture at a natural resonant frequency of that portion of the mixture while that portion of the mixture is in a fluid or semi-fluid state. A vibrating apparatus imparts controlled vibrations either onto the surface or beneath the surface of the liquid-solid work mixture in sequential stages, the frequency of vibrations generally increasing with each subsequent stage, corresponding to an increase in the natural resonant frequency of the progressively-narrowing liquid portion at the top of the liquid-solid work mixture. A resonant frequency-indicative condition of the liquid portion of the work mixture adjacent the vibrator apparatus is sensed as the vibrator apparatus moves across the top surface of the liquid-solid mixture, and the output frequency of the vibrating apparatus is correspondingly adjusted in accordance with the sensed condition as the vibrator apparatus travels. The controlled vibrations drive the liquid component of the liquid-solid mixture upwardly out of the mixture, thereby advantageously expediting the rate of consolidation, stiffening, and/or drying of the lower (solid) portion of the mixture, and advantageously filtering, decanting, and/or otherwise isolating the constituent ingredients of the mixture.

8 Claims, 15 Drawing Sheets

METHOD OF SEPARATING CONSTITUTENT INGREDIENTS OF MIXTURES BY STAGED RESONANT FREQUENCY VIBRATION

This is a continuation-in-part of U.S. patent application Ser. No. 08/160,916, filed Dec. 3, 1993 now U.S. Pat. No. 5,520,862.

BACKGROUND OF THE INVENTION

1. Field of Invention

The present invention generally relates to a method and apparatus for introducing vibrational energy into non-homogeneous mixtures to affect physical properties of the mixtures. More particularly, the present invention relates to a method and apparatus for affecting the distribution profile of constituent ingredients of a mixture by introducing vibrational energy at a resonant frequency of a portion of the mixture while that portion of the mixture is in a fluid or semi-fluid state.

2. Description of the Prior Art

As will be described more fully herein below, in the present invention a mass comprising a fluid or semi-fluid mixture is exposed in a series of sequential steps (or "stages") to vibrations at (or nearly at) a frequency corresponding to the local natural (i.e. resonant) frequency of a specified portion of the mixture at each respective stage of vibration, in order to advantageously change the distribution profile of constituent ingredients of the mixture. In the preferred embodiment of the invention, this is accomplished by traversing a vibrating apparatus across the top surface of the mixture in a series of sequential stages, sensing a physical condition of the mixture during each stage in relatively close proximity to the vibrating apparatus, and adjusting the frequency of vibration in response with the sensed physical condition as the vibrating apparatus travels across the top of the mixture.

By way of explanation, the invention's application to advantageously vary the distribution profile of the constituent ingredients of an initially wet concrete mixture is described. However, it will be understood that the present invention also may similarly be advantageously used to redistribute constituent ingredients of mixtures other than wet concrete, including liquid-solid mixtures, liquid-liquid mixtures, gas-gas mixtures, and solid-gas mixtures (eg. suspended solids).

In constructing concrete structures, such as concrete slabs and the like, certain conventional procedures involve simply placing the concrete mass in a form, allowing excess water in the mass to be driven out by gravity settlement of the more dense constituent solids of the concrete mixture, and finishing the top surface in various well known manners and permitting the concrete to harden with no vibration whatsoever. Other procedures involve the use of vibrators placed temporarily into or upon the concrete mass at various locations in order to drive the excess water out of the mass.

A problem with prior methods of placing concrete using vibrators is associated with the lack of control of the vibrators. When any one section of a poured concrete slab is vibrated too much, it causes "hard spots" in the concrete slab approximately at the location of the contact with the vibrator. In addition, over-vibration of the concrete can also cause aggregate separation in the vicinity of the vibrator. Aggregate separation and "hard spots" both result in a non-uniform and weakened final slab. For these reasons, prior concrete placing operations typically cautiously "under-vibrate" the concrete mass or may not vibrate the concrete mass at all.

The principal purpose of vibrating plastic concrete in this context is to expeditiously consolidate the concrete mass at as nearly a uniform density as possible by encouraging and assisting the upward migration of water and air which would otherwise migrate slowly or not at all. Entrapment of air and water weakens the concrete, and the slow migration of these materials extends the time required to place and finish the concrete mass.

Prior procedures for the application of vibrations to the concrete mass provide virtually no means to control or to modify the vibrational characteristics (such as frequency, amplitude, etc.) of the vibrators (other than by manually turning the vibrator off and on), and only crude means to control or modify the length of time the vibrators act upon the concrete mass. Therefore, the prior procedures produce a concrete mass in which the degree of consolidation varies from one location to the other (resulting in a structure of inconsistent structural integrity), and in which the time required for water to evaporate from the surface varies from one location to the other (making it very difficult to finish the structure by using automatic or robotic finishing equipment).

Another problem of prior vibrators used for redistribution of the water-solid profile of concrete mixtures is that, because the vibrating apparatus typically do not vibrate at a frequency corresponding to the natural resonant frequency of the wet concrete mixture, the energy demand upon the vibrating apparatus was so high that it necessarily limited the method of vibrating, the frequency of vibration, and the construction of the vibrating apparatus.

Furthermore, because the water-solid profile of the concrete is inherently affected by vibration of the concrete mass, the natural resonant frequency of the wet concrete mass continuously changes during vibration; thus optimum vibration efficiency (i.e. corresponding to vibrating at the instantaneous resonance frequency of the wet concrete) cannot be achieved for any period of time with a single vibrator apparatus operating at a single, or at a preselected, frequency.

Similarly, because the water-solid profile of the concrete mass is notoriously variable from one region to another horizontally spaced apart region, the natural resonant frequency of the wet concrete mass correspondingly varies between horizontally spaced apart regions; thus optimum vibration efficiency (i.e. corresponding to vibrating at the instantaneous resonance frequency of the wet concrete) frequently cannot be achieved between a plurality of horizontally spaced apart regions with a single vibrator apparatus operating at a single, or at a preselected, frequency.

SUMMARY OF THE INVENTION

Accordingly, it is a primary objective of the present invention to provide a method and apparatus for affecting the distribution profile of constituent ingredients of a mixture by introducing vibrational energy at the resonant frequency of a specific portion of the mixture into said the mixture while that portion is in a fluid or semi-fluid state.

It is another object of the present invention to provide a method and apparatus of the character described wherein the frequency of vibrations introduced into the mixture is user-adjusted over time in accordance with changes in the natural resonant frequency of the vibrated mixture.

It is another object of the present invention to provide a method and apparatus of the character described wherein the frequency of vibrations introduced into the mixture is user-adjusted between spatially separated regions of the mixture in accordance with differences in the natural resonant frequency of the mixture at different regions.

It is another objective of the present invention to provide a method and apparatus of the character described in which the rate of redistribution of constituent ingredients of the mixture is controlled by a plurality of "stages" (or series of vibrations of the concrete mass).

It is another objective of the present invention to provide a method and apparatus of the character described in which each "stage" affects only (or predominantly) a portion of the total cross-section of the mixture.

It is another objective to provide a modification of the present invention in which, of total vibrational energy introduced into the mixture by a vibrating apparatus, the proportion introduced into a relatively "wet" portion of the mixture is optimized, and the portion introduced into a relatively "dry" portion of the mixture is minimized.

It is another object to provide a modification of the present invention in which the resonant frequency of a relatively "wet" portion of the mixture is determined, either directly or indirectly, and one or more characteristics of the vibrational energy imparted into the mixture is advantageously varied in accordance with such measurement.

It is another objective to provide a modification of the present invention in which vibrations are introduced into the mixture by a magnetostrictive vibrating member.

These together with other objectives and advantages which will become subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

As will be described more fully herein below, in the present invention a mass comprising a fluid or semi-fluid mixture is exposed in a series of sequential steps (or "stages") to vibrations at (or nearly at) a frequency corresponding to the local natural (i.e. resonant) frequency of periodically changing working volumes of the mixture at each respective stage of vibration, in order to advantageously change the distribution profile of constituent ingredients of the mixture. By way of explanation, the invention's application to advantageously vary the distribution profile of the constituent ingredients of an initially wet concrete mixture is described.

The preferred embodiment of the present invention is an apparatus and method for placing concrete slabs (and related structures) in which vibrational energy is imparted into an uncured, plastic concrete mass M in a controlled fashion so as to affect (among other things) the "firmness" of the concrete mass. In this context, the terms "firm" and "firmness" refer to the compactness of the concrete mass, or, more specifically, to the degree of "solidity" when referring to any portion of the concrete mass which predominantly exhibits solid-like properties, or to the degree of "liquidity" when referring to any portion of the concrete mass which predominantly exhibits liquid-like properties. It will be understood that increasing the firmness in any portion of the concrete mass which predominantly exhibits liquid-like properties corresponds to decreasing its "liquidity"; and increasing the firmness in any portion of the concrete mass which predominantly exhibits solid-like properties corresponds to increasing its "solidity".

Although the concrete mass M, when initially poured, is actually a mixture of solids (including cement, aggregates, etc.) and liquid (primarily water), the initially-poured concrete mass predominantly exhibits liquid-like properties and thus may be characterized as acting, as a whole, like a liquid for purposes of following the disclosure. In the figures, line 70 generally corresponds to a degree of "firmness" to the right of which the concrete mass may be characterized as acting more like a solid, and to the left of which the concrete mass may be characterized as acting more like a liquid.

Figure 1:
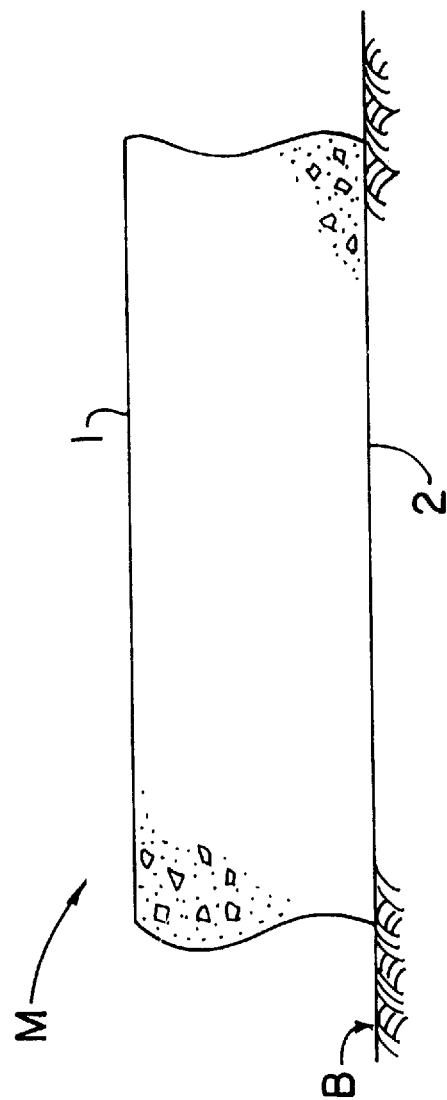
FIG. 1 is a schematic cross-sectional elevation illustrating a concrete slab under construction immediately after the concrete mass has been poured.

FIG. 1 of the drawings illustrates a concrete mass (generally indicated "M" in the figures) which may be in the form of a slab as the concrete has been poured into a form (not shown) or the like from any suitable source onto a slab sub-base B. The concrete mass M typically includes aggregate, cement, water and other additives which may conventionally be employed in concrete slabs.

When the concrete mass M is initially poured, the aggregate, cement, water and other materials incorporated into the concrete are typically randomly distributed throughout the thickness of the concrete mass M between the sub-base B and the exposed top surface 1 of the concrete slab. At the instant at which the concrete mass M is first poured, virtually none of the concrete mass is sufficiently consolidated, firm and dry enough for purposes of finishing the top surface 1 of the slab. (In this context, the word "finishing" is a term of art which refers to the way in which the surface of a concrete slab is smoothed.) Also, at the instant at which the concrete mass M is first poured, there typically exists variations in the moisture content and the degree of consolidation of the concrete mass M from one point to another over the entire volume of the concrete mass M. Such variation in consistency of poured concrete is not crucial to the operation of the present invention, but, as will be appreciated by those skilled in the art, is an inherent (and undesirable) property of randomly mixed concrete.

It will also be appreciated by those skilled in the art that it is not uncommon for great differences in the consistency of mixed concrete to exist from one truckload of concrete to the next. Thus, even when the concrete which is poured from any particular truck is of relatively uniform consistency, there may be extremely wide variations in consistency of the poured concrete when a concrete slab is constructed from multiple-pours.

Accordingly, in concrete slabs constructed from multiple-truckload pours, it is not uncommon for there to be relatively large variations in the consistency of the poured concrete in a horizontal plane, even while there may be relatively smaller variations in the consistency of the poured concrete in a vertical plane. Again, such variation in the consistency of poured concrete is not crucial to the operation of the present invention, but, as will be appreciated by those skilled in the art, is a frequently encountered (and undesirable) property of concrete slabs constructed from multiple-pours of concrete.

Figure 2:
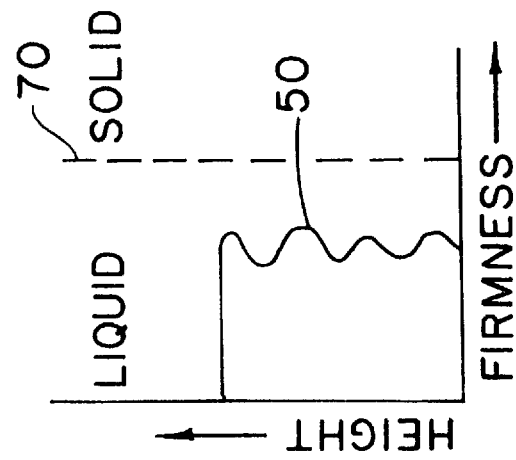
FIG. 2 is a graph which plots the firmness profile of the concrete slab of FIG. 1.

FIG. 2 is a graph illustrating a typical profile "firmness" gradient between the top and the bottom of the slab at the instant at which the concrete mass M is first poured.

When concrete slabs (and similar structures) are placed, it is conventional practice to employ a concrete mass which initially has far more moisture content, is far less consolidated, and is far less firm than that which is necessary to begin finishing operations. These properties are initially desirable when placing a concrete structure because they render the concrete mass much more "liquid-like" and workable than would otherwise be the case. In addition, the initial surplus of water in the concrete mass has the effect of preventing or retarding the (undesirable) premature curing of the concrete mass. After the overly moist, "liquid-like" concrete mass is poured into place and is roughly brought to the desired depth and shape of the slab, it is then necessary for the excess water to be removed, and for the concrete mass to become more consolidated and more "firm" before finishing operations can be commenced.

As indicated by the irregular line 50 in FIG. 2, at the instant at which the concrete mass is first poured, the firmness of the concrete mass may vary somewhat from the top of the slab to the bottom, but on average it is virtually constant from the bottom of the slab to the top.

Line 70 represents a value of constant firmness in FIGS. 2, 4, 7, 9 and 11, and is representative of the minimum value of "firmness" to the right of which the concrete mass may be before commencing finishing operations. Also, as discussed previously (above), line 70 generally corresponds to a degree of "firmness" to the right of which the concrete mass may be characterized as acting more like a solid, and to the left of which the concrete mass may be characterized as acting more like a liquid. As indicated in FIG. 2, at the instant at which the concrete mass is first poured, the entire concrete mass is less firm than the minimum desirable value, represented by line 70.

Figure 3:
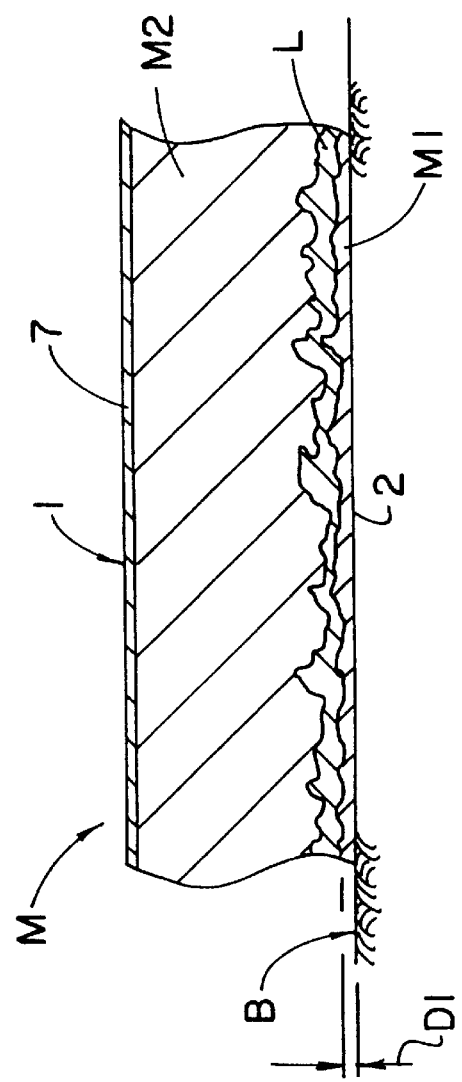
FIG. 3 is a schematic cross-sectional elevation of the concrete slab of FIG. 1 shown a short time after the concrete mass has been poured, prior to vibration of the concrete mass.

Referring now to FIG. 3: After the concrete mass M has been poured onto the sub-base B into the form of a slab, the weight of the aggregates (not shown) which comprise the concrete mass naturally push downward toward the sub-base B. The aggregates, being of relatively high density, begin to squeeze water and entrapped air out of the concrete mass M. Because there is more pressure near the bottom 2 of the slab than near the top 1 of the slab, more of the water and entrapped air is initially squeezed out of the concrete mass near the bottom of the slab than near the top of the slab, thus resulting in relatively more consolidated, relatively more firm and relatively drier concrete M1 near the bottom 2 of the slab, and relatively less consolidated, relatively less firm and relatively less dry concrete M2 nearer the top 1 of the slab.

Figure 4:
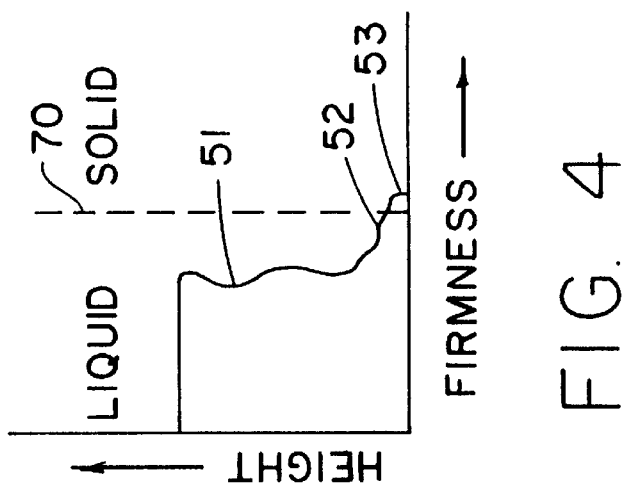
FIG. 4 is a graph which plots the firmness profile of the concrete slab of FIG. 3.

FIG. 4 is a graph illustrating a typical profile firmness gradient between the top and the bottom of the slab after the concrete mass M is first poured and natural de-watering has begun. As illustrated in FIG. 4, after natural de-watering has begun, the firmness of the concrete mass is generally greater nearer the bottom of the slab (as indicated by line segment 53) and is generally less nearer the top of the slab (as indicated by line segment 51). Between line segment 51 and line segment 53 is a relatively more flat line segment 52 which corresponds to a transition zone L between the relatively more firm concrete mass M1 nearer the bottom of the slab 2 and the relatively less firm concrete mass M2 nearer the top of the slab 1.

It may be interpreted from a review of FIG. 4 that the relatively less firm concrete mass M2 may be characterized as having predominantly liquid-like properties. Furthermore, because (on average) the water-to-solids ratio in the (liquid) concrete mass M2 decreases with increased depth below the top of the slab, (due to natural de-watering), the firmness of the (liquid) concrete mass M2 may be somewhat less firm nearer the top of the slab than nearer the transition zone L. It may also be understood from a review of FIG. 4 that the relatively more firm concrete mass M1 may be characterized as having predominantly solid-like properties.

Since the concrete mass M2 (i.e. above the transition zone L) is effectively a liquid, and since the concrete mass M1 (i.e. below the transition zone) is effectively a solid, the natural resonant frequency of the (liquid) concrete mass M2 above the transition zone L will, in most instances, be different from the natural resonant frequency of the (solid) concrete mass M1 below the transition zone. In any event, whether the natural resonant frequencies of the (liquid) concrete mass M2 and the (solid) concrete mass M1 are identical or different, the speed of sound (i.e. the rate of propagation of vibrations) through the former will in all cases be different from (i.e. slower than) the speed of sound through the latter. In addition, due to the natural acoustical impedance between the (liquid) concrete mass M2 and the (solid) concrete mass M1, any mechanical vibration introduced directly into the (liquid) concrete mass M2 will predominantly stay within the (liquid) concrete mass M2, and, accordingly, may have a much greater affect on the (liquid) concrete mass M2 than on the (solid) concrete mass M1.

Referring again to FIG. 3: At the surface 1 of the concrete slab there typically develops a finishing zone 7 which preferably is no more than ¼ inch thick. In the finishing zone 7 migrated water may collect throughout the placing operation. Also, finishing operations (which will be described in more detail later) may be used which effect a relatively higher concentration of "fines" and "superfines", and a relatively lower concentration of aggregates, in the finishing zone 7 than in the rest of the concrete mass M.

Between the relatively more consolidated, relatively more firm and relatively drier (solid) concrete mass M1 near the bottom 2 of the slab and the relatively less consolidated, relatively less firm and relatively less dry (liquid) concrete mass M2 nearer the top 1 of the slab, is a transition zone L. For purposes of understanding the present disclosure, the transition zone L may be interpreted as representing a boundary layer above which the concrete mass M2 exhibits liquid-like properties and below which the concrete mass M1 exhibits solid-like properties.

In the transition zone L the average firmness gradient (i.e. the change in firmness divided by the change in elevation) is typically significantly greater than the average firmness gradients in the (solid) concrete mass M1 at the bottom of the slab and the (liquid) concrete mass M2 at the top of the slab. In practice the transition zone L may be either a relatively narrow layer (measuring, perhaps, only a millimeter thick) or a relatively thick zone, depending on the properties of the concrete mass and its environment.

Because of the inconsistencies inherent in the mixing and pouring of concrete, the depth of the transition zone L which naturally occurs in a poured slab is notoriously uneven, as illustrated in FIG. 3. In addition, there may exist wide variations in the depths of the transition zone L from one area of the concrete slab to another, (i.e. between horizontally separated areas of the concrete slab). Such wide variations in the depth of the transition zone L from one area of the concrete slab to another may occur, for example, whenever a single concrete slab is poured from a plurality of truckloads of mixed concrete. It will be appreciated by those skilled in the art that the curing rate (and, therefore, the strength and consistency) of the concrete mass M will normally vary depending upon the depth of the transition zone L below the top surface 1 of the slab. More specifically, in a given vertical segment of the concrete slab, the greater the depth below the surface 1 to the bottom of the insufficiently consolidated, insufficiently firm and insufficiently dry (liquid) concrete mass M2, the longer the curing time for that particular vertical segment of the concrete slab.

[For purposes of simplifying the explanation and understanding of the present invention, three sub-surface areas of the poured concrete mass M are referred to in this disclosure, namely the areas designated in the figures as M1, M2 and L. Although the concrete mass in each of these designated areas (M1, M2 and L) has individually definable physical properties (i.e. degree of consolidation, firmness, etc.), it should be understood that adjacent "layers" of the concrete mass are continuous, are intrinsically interconnected with each other, and together may form a single concrete slab.]

Figure 5:
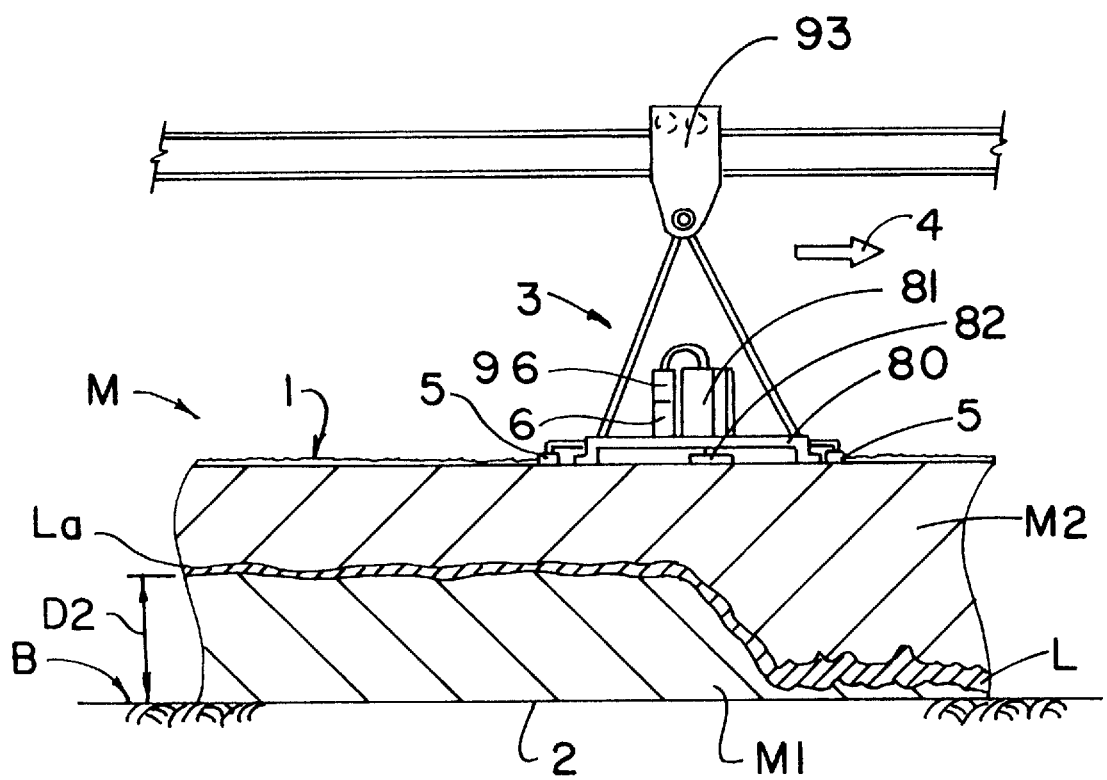
FIG. 5 is a schematic cross-sectional elevation of the concrete slab of FIG. 1 shown during the first stage of vibration using the present invention.

Referring now to FIG. 5: A vibrator apparatus (generally designated 3 in the figures, and hereinafter referred to in its entirety as the "Apparatus") capable of introducing vibrations into the concrete mass M moves across the top surface 1 of the slab in the forward direction (indicated by arrow 4 in the figures). As the Apparatus 3 is activated, it introduces vibrations (at a first frequency) into the concrete mass M beneath the vibrator Apparatus 3, which causes water and air entrapped inside of the concrete mass M to migrate upwards towards the top surface 1 of the slab. The frequency of vibrations which is introduced into the concrete mass M during this first pass (or "stage") may advantageously be preselected (based, for example, upon prior experience with concrete slabs having similar water content, similar thickness, similar aggregate size, etc.) to be within the range of natural resonant frequencies of the (liquid) concrete mass M2 which are typical for such newly poured slabs.

As the water and air migrate upward due to the vibrations, the depth of the relatively more consolidated, relatively more firm and relatively drier (solid) concrete mass M1 near the bottom 2 of the slab rises, and, correspondingly, the depth of the transition zone La across the slab also rises. It will be appreciated by those skilled in the art that as the depth of the relatively more consolidated, relatively more firm and relatively drier (solid) concrete mass M1 near the bottom 2 of the slab rises, the natural resonant frequency of this portion of the concrete mass M1 changes; and, as the thickness of the relatively less consolidated, relatively more wet (liquid) concrete mass M2 near the top of the slab decreases, the natural resonant frequency of this portion of the concrete mass M2 also changes. More specifically, as the thickness of the relatively less consolidated and relatively more wet (liquid) concrete mass M2 becomes thinner, its natural resonant frequency increases.

Figure 6:
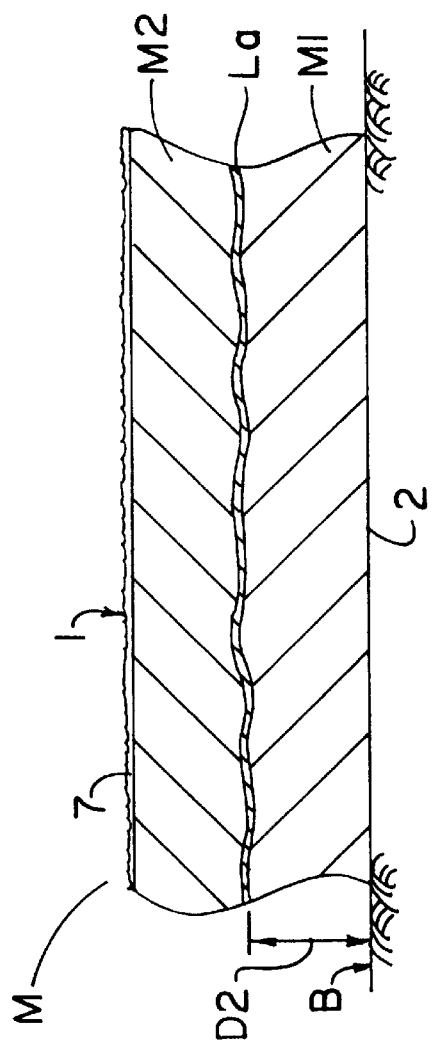
FIG. 6 is a schematic cross-sectional elevation of the concrete slab of FIG. 1 shown immediately after the first stage of vibration using the present invention.
Figure 9:
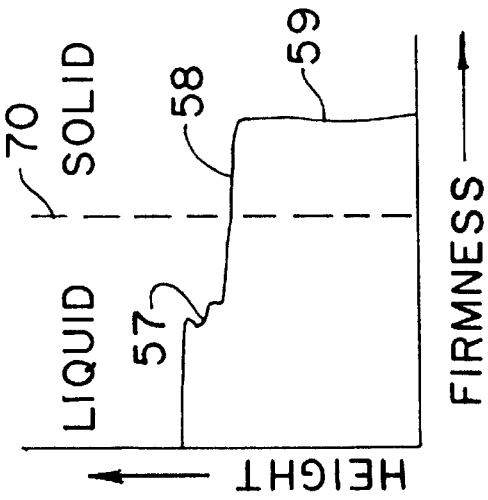
FIG. 9 is a graph which plots the firmness profile of the left hand side of the concrete slab of FIG. 8 after the passage of the vibrator.

FIG. 6 illustrates the condition of the concrete slab after the Apparatus 3 has completed a first pass or first "stage" of vibration of the concrete mass M. It will be understood that the volume of the sufficiently consolidated, sufficiently firm and sufficiently dry (solid) concrete mass M1 is greater after the first stage of vibration is completed (as indicated by dimension D2 in FIG. 6) than existed prior to the first stage of vibration (as indicated by dimension D1 in FIG. 3).

Figure 7:
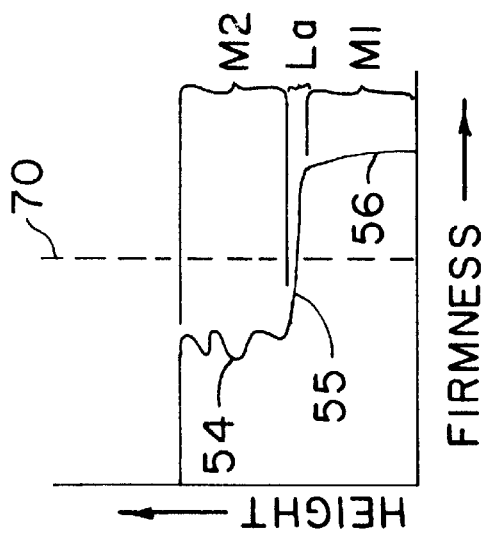
FIG. 7 is a graph which plots the firmness profile of the concrete slab of FIG. 6.

FIG. 7 illustrates a typical profile firmness gradient between the top and the bottom of the slab shortly after the vibrator Apparatus has completed a first pass across the concrete mass. As illustrated in FIG. 7, shortly after the vibrator Apparatus has completed a first pass across the concrete slab, the (solid) concrete mass M1 beneath the transition zone La has not only become deeper, but also somewhat more firm, than was the case prior to the first pass of the vibrator (as indicated by line segment 56 in FIG. 7, as contrasted to corresponding line segment 53 in FIG. 4).

The reason the depth of the (solid) concrete mass M1 increases after the Apparatus 3 has introduced vibrations is that, by vibrating the concrete mass, the upward migration of the excess water in the concrete mass is accelerated (relative to the rate of water migration which would naturally occur if left un-vibrated). It has been observed that when a liquid concrete mass (such as concrete mass M2) is vibrated, excess water which may be between the various solid constituents of the concrete mass (i.e. aggregate, cement, etc.) percolates upward toward the top surface of the slab at an accelerated rate so long as there is sufficient quantity of water in the vibrated concrete mass to separate the individual solid constituents from each other. In a sense, the excess water lubricates the solid constituents of the (liquid) concrete mass, giving the mass the characteristics of a liquid. When sufficient amount of water is removed from the concrete mass, the water can no longer adequately lubricate the solid constituents of the concrete mass, and the individual solid constituents begin to mechanically "lock up" against one another. Once a sufficient amount of water has been removed from a portion of the concrete mass to allow the individual solid constituents to mechanically lock up against one another, that portion of the concrete mass begins to exhibit the characteristics of a solid.

The reason the (solid) concrete mass M1 becomes more firm after the concrete mass has been vibrated by the vibrator Apparatus (as indicated by line segment 56 in FIG. 7) than would occur, for example, due to natural de-watering (as indicated by line segment 53 in FIG. 4), is that, by vibrating the individual constituent solids in the concrete mass, the individual constituent solids can move into voids, thus facilitating greater consolidation and greater "locking up" of the constituent solids.

Figure 8:
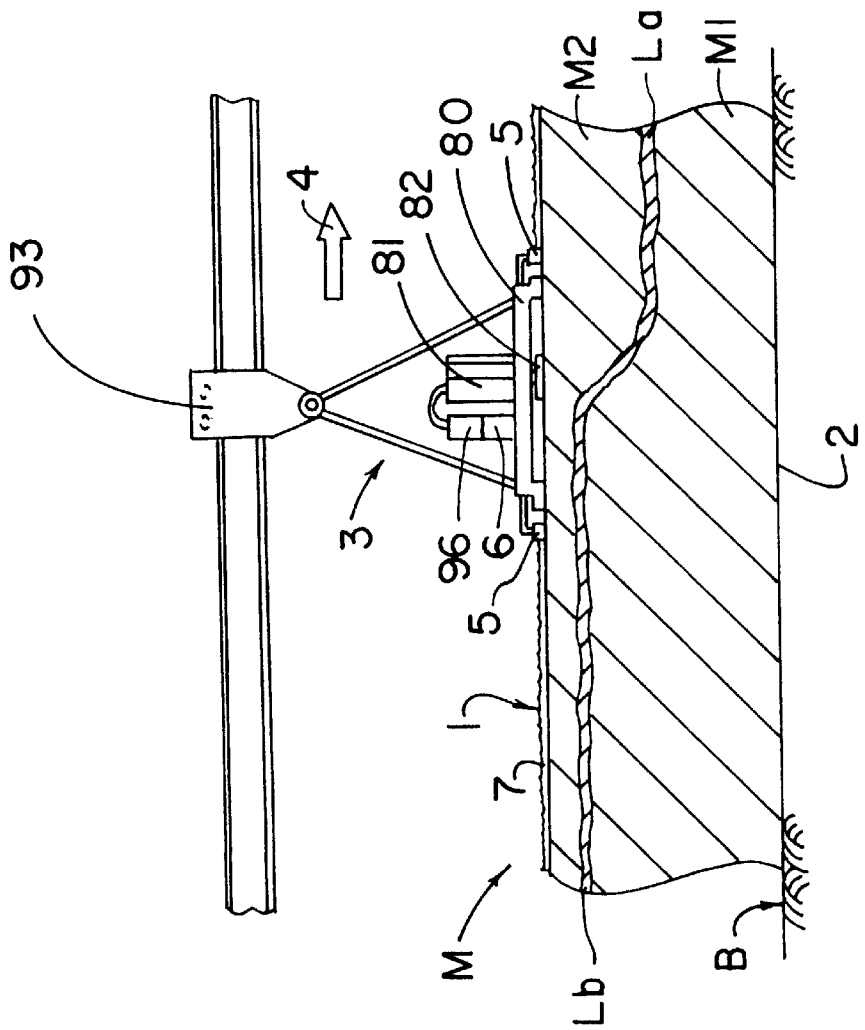
FIG. 8 is a schematic cross-sectional elevation of the concrete slab of FIG. 1 shown during the second stage of vibration using the present invention.
Figure 11:
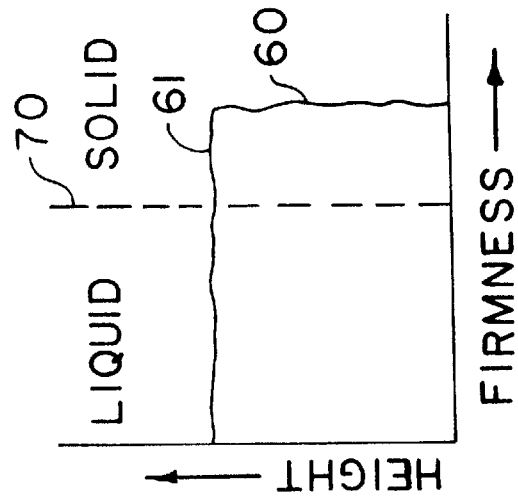
FIG. 11 is a graph which plots the firmness profile of the left hand side of the concrete slab of FIG. 10 after the passage of the vibrator.

Referring now to FIG. 8: After the transition zone La has been somewhat raised, by the first pass or "stage" of vibration, the same (or a similar) vibrator Apparatus 3 may then be used for a second pass or "stage" of vibration, as shown in FIG. 8, to further raise the transition zone Lb, and thereby increase the thickness of the relatively more consolidated, relatively more firm and relatively drier (solid) concrete mass M1 below the transition zone Lb and decrease the thickness of the relatively less consolidated, relatively less firm and relatively more wet (liquid) concrete M2 mass near the top of the slab.

The frequency of the vibrations introduced into the concrete mass during the second pass is preferably set at a second frequency, corresponding to the natural resonant frequency of the relatively less consolidated, relatively less firm and relatively more wet (liquid) concrete mass M2. By adjusting the frequency of the vibrations to be introduced into the concrete mass during the second pass (i.e. from the first frequency to the second frequency) to correspond to the natural resonant frequency of the (liquid) concrete mass M2 which is above the transition zone La, the amount of vibrational energy necessary to sufficiently shake the (liquid) concrete mass M2 to cause consolidation and upward migration of water can be minimized. Also, as will be appreciated by those skilled in the art, because the resonant frequency of the relatively more consolidated (solid) concrete mass M1 below the transition zone in most cases significantly differs from the resonant frequency of the (liquid) concrete mass M2 above the transition zone, and because of the acoustic impedance between the (liquid) concrete mass M2 and the (solid) concrete mass M1, the Apparatus-introduced vibrations will have far more effect (i.e. will cause more severe shaking, and, therefore, more particle consolidation and water migration) within the (liquid) concrete mass M2 near the top of the slab than within the (solid) concrete mass M1 near the bottom of the slab. Thus, by introducing vibrational energy into the (liquid) concrete mass M2 at or near the natural resonant frequency of the (liquid) concrete mass M2, it is possible to minimize the amount of vibrational energy which is required to effect the desired consolidation of the constituent solids of the concrete mass (because the vibrational energy more efficiently passes through this portion of the concrete mass at or near its resonant frequency).

Not only may the amount of vibrational energy introduced into the concrete mass M be reduced because of the increased efficiency of transmission through the relatively wet concrete mass M2, but also because the (liquid) concrete mass M2 (i.e. that portion of the concrete which still needs to be consolidated, dried and "firmed up") comprises only a fraction of the entire mass of the slab. In other words, in accordance with the present invention, it is not necessary to introduce enough energy to excite the entire concrete slab; rather, it is only necessary to excite the "liquid" portion of the entire concrete slab.

It will be understood that by minimizing the amount of vibrational energy introduced by the Apparatus into the concrete mass M, the power requirements, as well as the structural and maintenance requirements, of the Apparatus may be reduced.

It is further understood that by applying controlled vibrations into the concrete mass M in the manner described above, the consolidation and drying of the concrete mass M is expedited relative to that which would naturally occur from natural gravitational settling of the concrete mass.

In addition to more rapidly consolidating and drying the concrete mass M, the structural integrity of the slab is improved by the disclosed method. The structural integrity of the slab is improved by use of the present invention due to the improved consistency of consolidation, (represented by the substantially horizontal orientation of the transition zone Lb in FIG. 8, and as indicated by vertical line segment 59 in FIG. 9); and due to the expedited migration (and subsequent removal) of water and entrapped air from the concrete mass which advantageously results in less entrapped water and air pockets in the concrete slab; and due to the greater degree of consolidation of the constituent solids of the concrete mass facilitated by the vibration/movement of the constituent solids.

Figure 10:
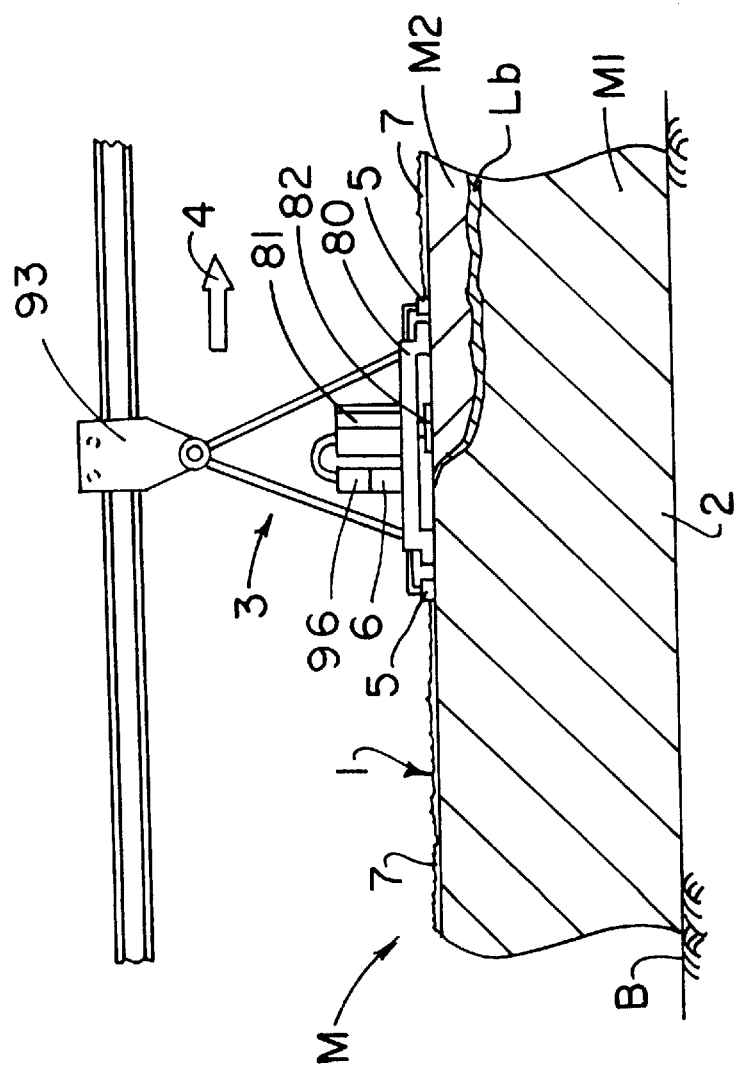
FIG. 10 is a schematic cross-sectional elevation of the concrete slab of FIG. 1 shown during the final stage of vibration using the present invention.

Subsequent to the second stage (as shown in FIG. 8) and prior to a final stage (as shown in FIG. 10), there may be any number of intermediate stages (or passes of the vibrator Apparatus) as may be desirable depending on the properties of the particular slab being placed. Generally, the thicker the slab the more stages that are required. It will be understood from the above disclosure of the present invention that by adjusting the frequency of the vibrations introduced into the concrete mass during each pass to correspond to (or nearly to) the natural resonant frequency (during that particular pass) of the relatively less consolidated, relatively less firm and relatively more wet (liquid) concrete mass M2, the drying and curing of the slab can be expedited, and the resulting structure will be of substantially uniform composition.

Referring now to FIG. 10: Preferably, upon completion of a final "stage" of vibration or a final pass of the vibrator Apparatus across the surface 1 of the concrete slab, the depth of the sufficiently consolidated, sufficiently firm and sufficiently dry (solid) concrete mass M1 extends from the bottom of the slab 2 to (or nearly to) the finishing zone 7 at the top surface of the concrete slab 1. Typically, the water which had migrated toward the top of the slab 1 may accumulate in the finishing zone 7, and may subsequently simply evaporate, run off the slab due to gravity, be pushed off the slab by the vibrator Apparatus 3, be vacuumed, or otherwise removed.

It may be appreciated from an understanding of the foregoing disclosure that by using a method and apparatus of placing concrete in accordance with the disclosed invention, the transition zone L, (or more specifically the top of the sufficiently consolidated, firm and dry (solid) concrete mass M1), is evenly brought up toward the top surface of the concrete slab 1. Because the transition zone L, (or more specifically the top of the sufficiently consolidated, firm and dry (solid) concrete mass M1), is evenly brought up toward the top surface of the concrete slab 1, the entire top of the slab 1 (or more specifically, the finishing zone 7) attains the condition for finishing operations at substantially the same time.

It will be understood from the foregoing disclosure that the optimal frequency at which to introduce vibrations into the concrete slab during any one pass of the vibrator Apparatus is that frequency which corresponds to the natural resonant frequency of the relatively less consolidated, relatively less firm and relatively more wet (liquid) concrete mass M2 beneath the Apparatus 3 during that particular pass. It will also be appreciated by those skilled in the art that the natural resonant frequency of the relatively less consolidated, relatively less firm and relatively more wet (liquid) concrete mass M2 changes (i.e. increases) with each stage of vibration. Several schemes are disclosed below for accommodating variations and changes in the natural resonant frequency of the (liquid) concrete mass M2.

Figure 19:
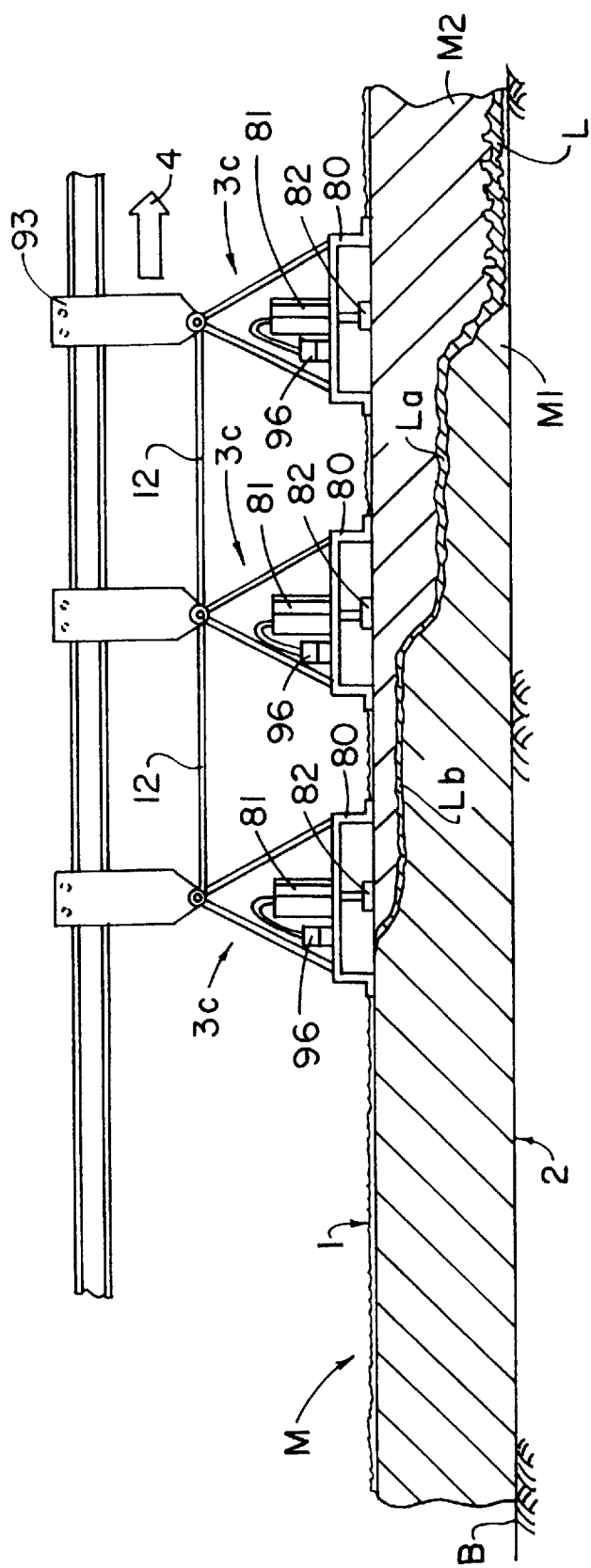

In one method of using the present invention a series of individual vibrator Apparatuses 3 may pass over the wet concrete at a predetermined fixed speed, with each individual vibrator Apparatus vibrating at a predetermined frequency and amplitude. As an example, there might be three such vibrator Apparatuses 3, the first of which vibrates at a relatively low fixed frequency. A second vibrator Apparatus, passing across the surface of the still-wet concrete after the first vibrator Apparatus has passed, might vibrate at a somewhat higher fixed frequency. A third vibrator Apparatus might vibrate at an even higher fixed frequency. The predetermined frequencies and amplitude of vibration and the speed at which the vibrator Apparatuses move would advantageously be chosen based on experience with concrete of various "slumps", thicknesses, and other factors. More particularly, the predetermined frequency of each vibrator would preferably be set to fall within the range of resonance frequencies typical of unconsolidated, liquid concrete having a thickness corresponding to the expected liquid concrete thickness for which each particular vibrator is used. The individual Apparatuses 3c may be secured to each other (for example by rigid link member 12), as illustrated in FIG. 19; in which instance, of course, all three Apparatuses 3c would travel at the same speed.

A modification of the above method of using the present invention is to employ vibrator Apparatuses which produce vibrations at user-selectable (i.e. variable) frequencies. Vibrators with user-adjustable frequency outputs are well known in other arts. By passing a series of vibrating plates over liquid concrete at a speed, frequency and amplitude which is set in the field (i.e. at the job site) by the operator, the user has much more flexibility and could, therefore, custom-set the vibrator output to correspond to the prevailing conditions of the concrete slab. The specific frequencies and amplitude of vibration and the speed at which the plates move would be based on the design thickness, aggregate size, and measured slump, temperature and/or other factors which are relatively easy to determine at the job site. With this method, it may be desirable, for example, to use either fewer or more vibrating plates depending whether the concrete mass is relatively thin or thick, respectively.

For optimal performance, the frequency of the output vibrations from the Apparatus 3 should be adjusted to fall within the range of resonance frequencies typical of unconsolidated, liquid concrete having a thickness, slump, aggregate size, etc., corresponding to the expected liquid concrete thickness beneath each vibrating plate. This method has the advantage of being adjustable to meet the conditions found at the specific job site. As with the above mentioned non-adjustable method, no sensors are required to directly measure the resonance frequency of the liquid concrete mass M2, as the choice of vibrator Apparatus output frequency would be made based, instead, on the design factors and other measurable field conditions, such as the thickness of the (liquid) concrete mass M2. A limitation of this method is that it does not take into account variations in the concrete mass which may not be obvious to an observer.

As will be understood from the foregoing disclosure, the optimal frequency at which to vibrate the placed concrete mass is that frequency which corresponds to the natural resonance frequency of the relatively less consolidated, relatively less firm and relatively more wet (liquid) concrete mass M2 beneath the vibrator Apparatus 3. It will also be understood that, as the thickness of the layer of relatively less consolidated, relatively less firm and relatively more wet (liquid) concrete mass M2 becomes thinner, its natural resonance frequency correspondingly changes (i.e. increases).

In the embodiment of the invention illustrated in FIGS. 5, 8 and 10, the Apparatus 3 comprises sensors 5 which extend from a rigid frame 80. The sensors 5 are in electrical communication with a processor unit 6 which is preferably supported from and secured to the rigid frame 80. Based upon data provided by the sensors 5, the processor unit 6 determines the natural resonance frequency of the relatively less consolidated, relatively less firm and relatively more wet (liquid) concrete mass M2 beneath the vibrator Apparatus 3. The electronic adjustment circuitry 96, which is in electrical communication with the processor unit 6, adjusts the output frequency of a magnetostrictive actuator 81 excited rigid vibrator member 82 to correspond to the determined resonance frequency of the (liquid) concrete mass M2 beneath the vibrator Apparatus 3. The vibrator member 82, which is preferably a rigid plate, is in direct contact with the (liquid) concrete mass M2, and vibrates the (liquid) concrete mass M2 at the output frequency of the magnetostrictive actuator 81 (i.e. preferably at or near the resonant frequency of the (liquid) concrete mass). The entire Apparatus 3 may be supported and be horizontally driven by a boom or rail system 93 or similar means, by attachment to the rigid frame 80.

Two alternative methods for determining the instantaneous resonance frequency of the relatively less consolidated, relatively less firm and relatively more wet (liquid) concrete mass M2 beneath the Apparatus 3 are disclosed below.

In one method for determining the instantaneous resonance frequency of the (liquid) concrete mass M2 beneath the Apparatus 3 illustrated in FIGS. 5, 8 and 10, sensors 5 in communication with the processor unit 6 monitor the instantaneous profile density and/or firmness gradient between the top and the bottom of the slab beneath the vibrator Apparatus 3. In operation the sensors 5 provide density and/or firmness data to a processor unit 6 which determines the depth of the transition zone L. By cross-indexing the determined depth of the transition zone L to empirical data permanently stored in the processing unit 6, the processing unit 6 can determine the approximate resonance frequency of the relatively less consolidated, relatively less firm and relatively more wet (liquid) concrete mass M2 beneath the sensor 5. The electronic adjustment circuitry 96 then adjusts the frequency of the vibration and/or the amplitude of the vibration of the magnetostrictive actuated vibrator member 82, and/or the duration of the vibration (i.e. by varying the forward speed of the Apparatus 3), as necessary to effect the desired shape and/or elevation of the transition zone La.

In a second method for determining the instantaneous resonance frequency of the (liquid) concrete mass M2 beneath the Apparatus 3 (as illustrated in FIGS. 5, 8 and 10), sensors 5 in communication with the processor unit 6 directly monitor the instantaneous natural frequency of the relatively less consolidated, relatively less firm and relatively more wet (liquid) concrete mass M2 beneath the Apparatus 3 by measuring the response (principally the amplitude of vibrations in the vibrating concrete mass) to the vibrations introduced into the concrete slab by the Apparatus 3 over a range of frequencies. Generally, the response (i.e. the amplitude of the vibrating (liquid) concrete mass M2) will be greatest when the output frequency of the Apparatus 3 is at the natural resonant frequency (or one of its harmonics) of the relatively less consolidated, relatively less firm and relatively more wet (liquid) concrete mass M2 beneath the vibrator Apparatus 3. The electronic adjustment circuitry 96 which is in communication with the processing unit 6 then adjusts the frequency of the vibration and/or the amplitude of the vibration of the magnetostrictive actuated vibrator member 82, and/or the duration of the vibration (i.e. by varying the forward speed of the Apparatus 3), as necessary to effect the desired shape and/or elevation of the transition zone La. In this method for determining the instantaneous resonance frequency of the (liquid) concrete mass M2 beneath the Apparatus 3, the sensors 5 measure the response (i.e. the efficiency of transmission) to a range of "test" frequencies, and, in effect, chooses that frequency which causes the greatest response (i.e. corresponding to the resonant frequency of the (liquid) concrete mass M2).

Figure 12:
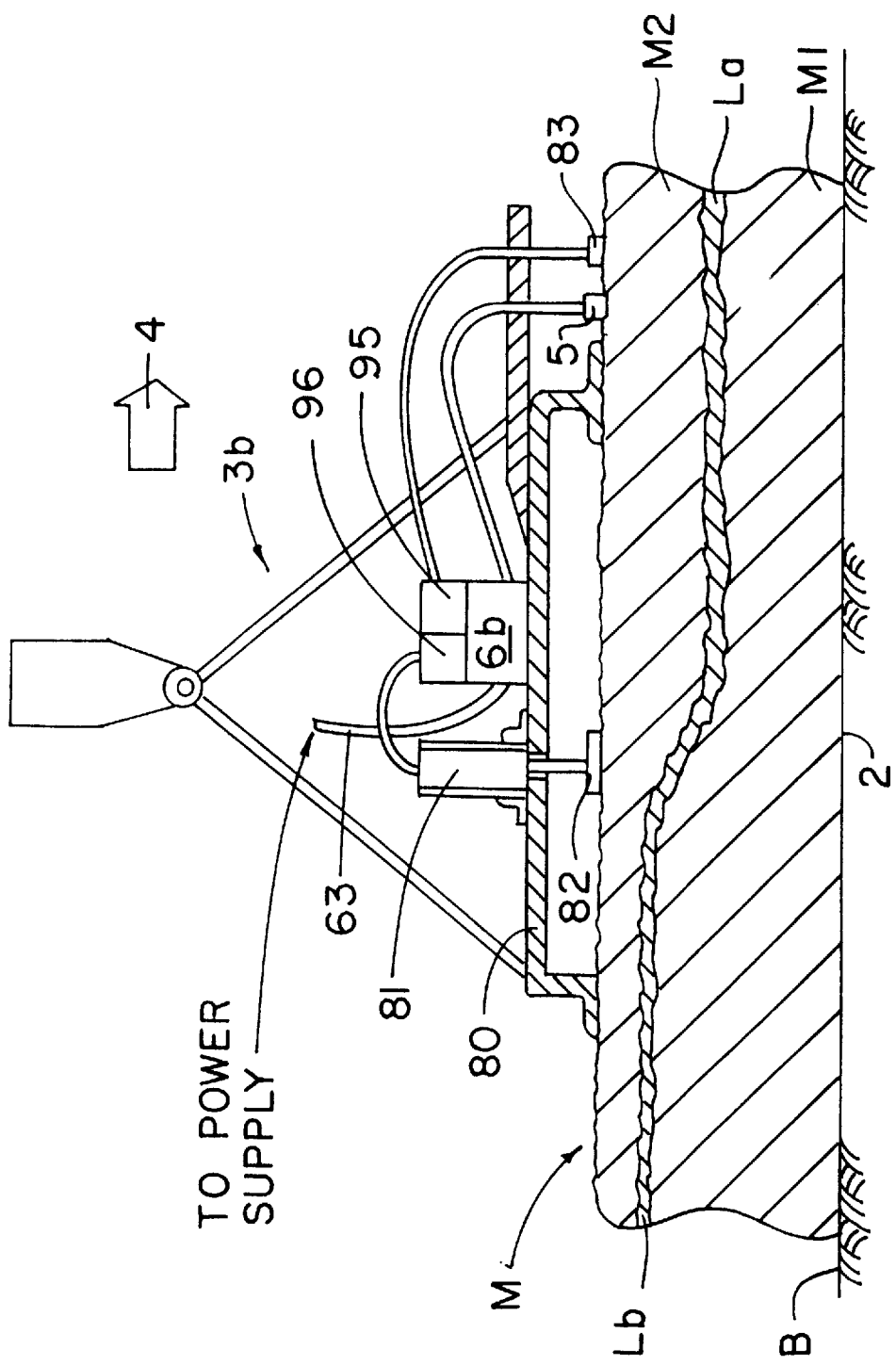
FIG. 12 is a schematic cross-sectional elevation of a concrete slab showing the preferred embodiment of the present invention.

The "test" frequencies used in this method for determining the instantaneous resonance frequency of the (liquid) concrete mass M2 beneath the Apparatus can either be generated directly by the vibrator member 82 (as illustrated in FIGS. 5, 8 and 10), or by a secondary "scanning vibrator" comprising a second magnetostrictive actuator 83 which oscillates a second rigid vibrator member 10, as shown in FIG. 12. In the preferred embodiment of the invention, as illustrated in FIG. 12, the frequency range of the "test" vibrations which emanate from the second rigid vibrator member 10 may be adjusted by electronic adjustment circuitry 95 which is in communication with the processor unit 6*b*.

Figure 13:
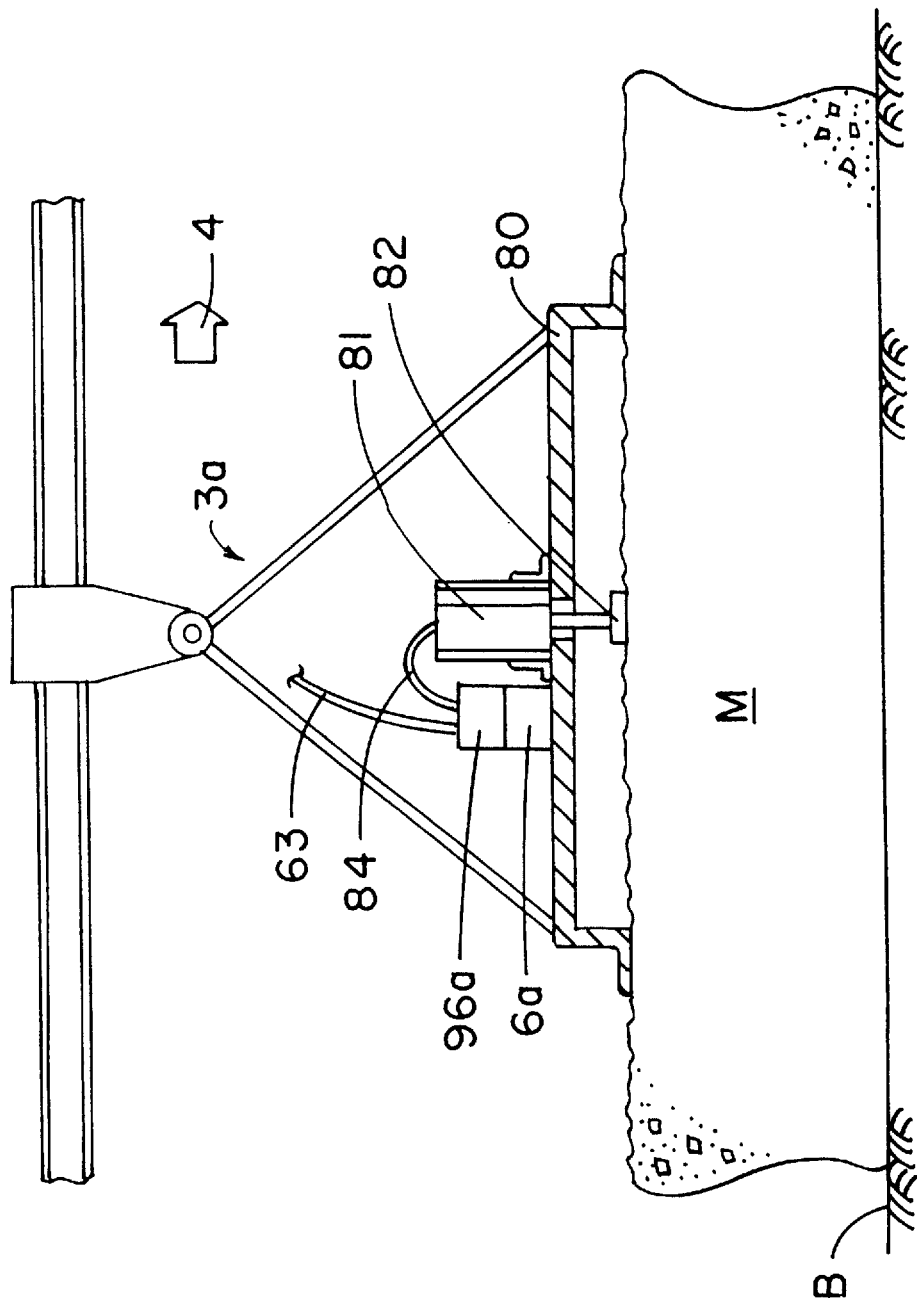
FIG. 13 is a schematic cross-sectional elevation showing a modified embodiment of the vibrator apparatus of the present invention.

Referring now to FIG. 13: Another modification of the invention is illustrated in FIG. 13. In this modification of the invention the vibrator Apparatus 3*a* comprises a rigid frame 80 to which is secured a magnetostrictive actuator 81 which oscillates vibrator member 82. A processor unit 6*a* is also secured to the rigid frame 80. The processor unit 6*a* and magnetostrictive actuator 81 are powered by electrical energy provided by an external power source (not shown) via electrical conductor 63. The processor unit 6*a* monitors the electrical current (and/or voltage) required to oscillate the magnetostrictive actuated vibrator member 82. It will be appreciated that, in operation, since the vibrator member 82 is in direct contact with the (liquid) concrete mass M2, the energy necessary to maintain oscillation of the vibrator member 82 will me minimized (i.e. will nearly approach zero) when the vibrator member 82 oscillates at or near the natural resonant frequency of the (liquid) concrete mass M2. Therefore, by simultaneously adjusting the output frequency of the magnetostrictive actuator 81 and monitoring its electrical (i.e. current and/or voltage) demand, it is possible for the processor unit 6*a* to directly determine the natural resonant frequency of the (liquid) concrete mass M2 adjacent the vibrator member 82. The electronic adjustment circuitry 96*a*, which in communication with the processor unit 6*a* and the magnetostrictive actuator 81, maintains the output frequency of the magnetostrictive actuated vibrator plate 82 at a given frequency so long as the electrical (i.e. current and/or voltage) demand of the magnetostrictive actuator 81 is below a predetermined level. This predetermined level of electrical demand corresponds to a vibrator member 82 output frequency which is nearly equivalent to (a harmonic of) the natural resonant frequency of the (liquid) concrete mass M2 adjacent the vibrator member 82. When the natural resonant frequency of the (liquid) concrete mass M2 changes, it will be more difficult for the magnetostrictive actuator 81 to vibrate the vibrator member 82, (due to interference of the non-resonant vibration waves) and, accordingly, the electrical demand of the magnetostrictive actuator 81 will increase. This increase in electrical demand will be sensed by an ammeter (not shown) which a component of the circuitry of the processor unit 6*a*. When the electrical demand for the magnetostrictive actuator 81 exceeds the predetermined level, the electronic adjustment circuitry 96*a* will cause the output frequency of the magnetostrictive actuator 81 to vary (i.e. increase) until the electrical demand again drops below the predetermined level. It will be appreciated that in this embodiment of the invention, the processor unit 6*a* and the magnetostrictive actuated vibrator member 82 fulfill the dual purposes of introducing vibrations into the (liquid) concrete mass and "sensing" the resonant frequency of that mass.

The present invention not only expedites the consolidation of the concrete mass M2 and the migration of the water from the interior of the concrete mass M2 to the surface by applying vibrational energy at or near the resonant frequency of the (liquid) concrete mass M2, but it also can be used to restrict the premature hardening of relatively shallow areas of moist and unconsolidated concrete by reducing the effects of (non-resonant) vibrational energy imparted into such shallow areas. It may be appreciated that if constant vibrational forces at random frequencies were equally imparted into all areas of a heterogenous concrete mass (i.e. of varying water-to-cement ratios, or of varying water-to-cement ratio, or of varying thicknesses, etc.), the transition zone would approach the surface of the slab earlier in some areas than in other areas, thus having the undesirable effect of causing "hard spots" in the concrete mass. Hard spots in concrete typically cause uneven curing, cause cracking of the slab, increase the difficulty of finishing operations, virtually preclude the use of automatic finishing equipment, and significantly reduce the structural integrity of the slab. By adjusting the vibrational energy imparted into various areas of the concrete mass M so as to evenly bring the transition zone L towards the surface 1 of the slab, a concrete slab made with the method and apparatus of the present invention has fewer (or no) hard spots, is more easily finished, has fewer cracks, and is structurally stronger than concrete slabs produced using either uncontrolled vibrations or using no vibrational input.

The disclosed staged vibration method and apparatus for placing concrete is effective due to the reaction of wet (or liquid) concrete to vibration. During vibration, the water, air and certain finer and lighter materials migrate upward, with the materials' migration being affected by the characteristics of the vibration- including the amplitude, frequency and duration of the vibration. The characteristics of the vibration are adjusted in the present invention to consolidate, or "firm up" the (liquid) concrete mass M2 at a controlled rate.

It will be understood from the foregoing disclosure that the optimal frequency at which to introduce vibrations into the plastic concrete slab is the natural resonant frequency of the (liquid) concrete mass M2 beneath the vibrator Apparatus 3. It has been found that if the output frequency of the Apparatus, (or more specifically, the frequency of vibration of the vibrator plate 82) is not within 25% of a harmonic of the natural resonant frequency of the (liquid) concrete mass M2, the energy imparted by the vibrator member into the concrete mass is quickly dissipated, and may be largely ineffective at exciting the constituent particles of the (liquid) concrete mass. Thus, unless the frequency of vibration of the vibrator plate 82 is within 25% of a harmonic of the natural resonant frequency of the (liquid) concrete mass with which it is in contact, an undesirably large amount of energy will be required to vibrate the concrete mass to effect accelerated consolidation and "firming up" of the (liquid) concrete mass M2. Accordingly, in all embodiments of the present invention, it is preferable for the output frequency of the magnetostrictive actuated vibrator member 82 to be within 25% of a harmonic of the natural resonant frequency of the (liquid) concrete mass M2. By introducing vibrations into the concrete mass at or near (i.e. with 25% of) the natural resonant frequency of the liquid concrete mass M2, the power requirements for the vibrator Apparatus can be minimized, because energy introduced into the concrete mass at or near the resonant frequency of the still-wet and unconsolidated concrete will impart more vibrational energy into the (liquid) concrete mass M2 than it will impart into the already-consolidated, drier concrete M1.

Representative ranges of the frequencies needed to set common thicknesses of concrete have been determined. To rapidly set the slab, the sound waves (i.e. vibrations) through the liquid concrete mass M2 need to cause the solid particles to move and shift position until they lock in place. The frequencies needed are quite closely related to the wavelength of the sound through the liquid concrete mass M2 and to the thickness of the liquid concrete mass M2. The following table shows representative calculated values of the resonant frequency needed to accelerate setting of wet, unconsolidated concrete layers of various thicknesses:

| Unset Thickness | Frequency Range | |
| --- | --- | --- |
| (inches) | Minimum | Maximum |
| 1/8 | 43200 | 86400 |
| 1/4 | 21600 | 43200 |
| 1/2 | 10800 | 21600 |
| 1 | 5400 | 10800 |
| 2 | 2700 | 5400 |
| 3 | 1800 | 3600 |
| 4 | 1350 | 2700 |
| 5 | 1080 | 2160 |
| 6 | 900 | 1800 |
| 7 | 770 | 1540 |
| 8 | 675 | 1350 |
| 9 | 600 | 1200 |
| 10 | 540 | 1080 |
| 11 | 490 | 980 |
| 12 | 450 | 900 |

While there is no single frequency that will give perfect results but rather an effective frequency band range, vibrating the relatively less consolidated, relatively less firm and relatively more wet (liquid) concrete mass M2 in the effective resonant range permits the use of much lower power vibrators to achieve the desired effect. Because the resonant frequency of the (liquid) concrete mass M2 typically increases when the thickness of the (liquid) concrete mass M2 decreases, and because the thickness of the (liquid) concrete mass typically decreases during each "stage" of vibration, it is advantageous for the vibrator Apparatus to introduce vibrations into the concrete mass either at the instantaneous resonant frequency of the (liquid) concrete mass M2 during each stage, or, alternatively, at a frequency slightly higher than the resonant frequency of the (liquid) concrete mass M2 at the beginning of each stage. In the latter case the vibrator Apparatus output frequency may be advantageously selected to correspond to the resonant frequency of the (liquid) concrete mass M2 when the (liquid) concrete mass M2 is at a thickness intermediately between the beginning and the end of each stage.

As will be appreciated by those skilled in the art, prior concrete placing vibrators typically comprise small gasoline powered engines which have output frequencies of less than 1500 rpm (25 hz). It will be understood from review of the above table that even in the case of relatively thick (12-inch) liquid concrete slabs, the natural resonant frequency (450 hz) of liquid concrete is at least 18 times as high as the maximum output frequency of prior concrete placing vibrators; and for most common concrete slabs the resonant frequency of the liquid concrete mass is more than 100 times the output frequency of prior concrete placing vibrators.

Because the natural resonant frequency of (liquid) liquid concrete layers of commonly-encountered thicknesses (i.e. 1/8" to 12") is so high (i.e. upwards to 86,400 hz.), the present invention preferably comprises magnetostrictive actuators which are well-suited to these relatively high output frequencies, rather than, for example, internal combustion engines.

While the foregoing describes the use of the present invention in placing a horizontal concrete slab of substantially constant thickness using a single pour of concrete, it should be understood that the application of this method and apparatus to the placing of slabs having substantially flat inclined top surfaces, and to the placing of slabs on top of uneven or inclined sub-bases are within the scope of the present invention.

For the sake of facilitating an understanding of the construction and operation of the present invention, the drawing figures (i.e. FIGS. 1–13 and 19) and the above specification describe the manner in which a vibrator Apparatus constructed in accordance with the present invention affects the properties of a typical cross-section of a poured concrete slab, said cross-section taken along the longitudinal path of the Apparatus as it travels over the concrete slab. It will be appreciated by those skilled in the art that the properties (such as moisture content, firmness, elevation of the transition zone, etc.) of the concrete mass M may (and in most cases will) also vary transversely to the direction of travel of the vibrator Apparatus for the same reasons discussed above with respect to such variations parallel to the direction of travel of the vibrator Apparatus. Accordingly it should be understood that it is within the scope of the present invention to provide a plurality of vibrator Apparatuses, each constructed in accordance with the present invention, beside each other and physically secured together (not shown); or, alternatively, to provide a vibrator Apparatus comprising a single processor unit, but having a plurality of individual magnetostrictive actuated rigid vibrator members laterally separated from each and supported from a common frame (not shown). By arranging the present invention in either of these two manners, variations in the properties of the concrete mass, both transverse to the direction of travel of the apparatus(es) as well as parallel to the direction of travel of the apparatus(es), may be independently accommodated.

SUMMARY OF THE PREFERRED METHODS OF PRACTICING THE INVENTION

The disclosed methods of practicing the present invention are summarized below. Individual steps are denoted by three-digit reference indicia in the corresponding drawing figures.

Figure 14:
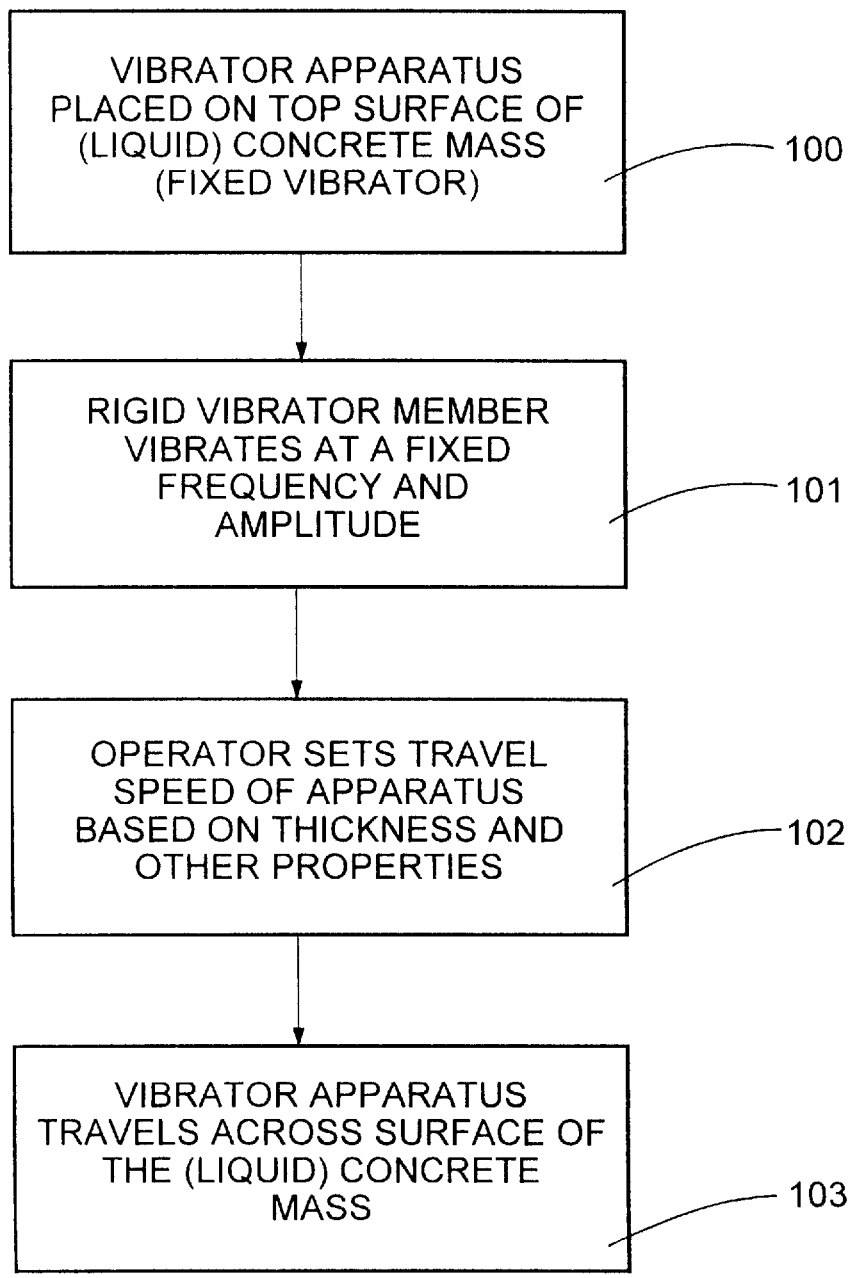
FIG. 14 is a schematic flow diagram showing a method of operating the present invention in a "fixed" mode.

Referring now to FIGS. 14 and 19: In the simplest method of practicing the present invention a vibrator Apparatus 3c having a rigid vibrator member 82 which vibrates at a fixed frequency and amplitude is placed 100 on the top surface 1 of a (liquid) concrete mass M2. The rigid vibrator member 82 vibrates 101 at or near a harmonic of a natural resonant frequency of the (liquid) concrete mass M2. Then, an Operator sets 102 the travel speed of the Apparatus 3, based on the thickness of the concrete mass and other properties, and the vibrator Apparatus 3c travels 103 across the surface of the (liquid) concrete mass.

Figure 15:
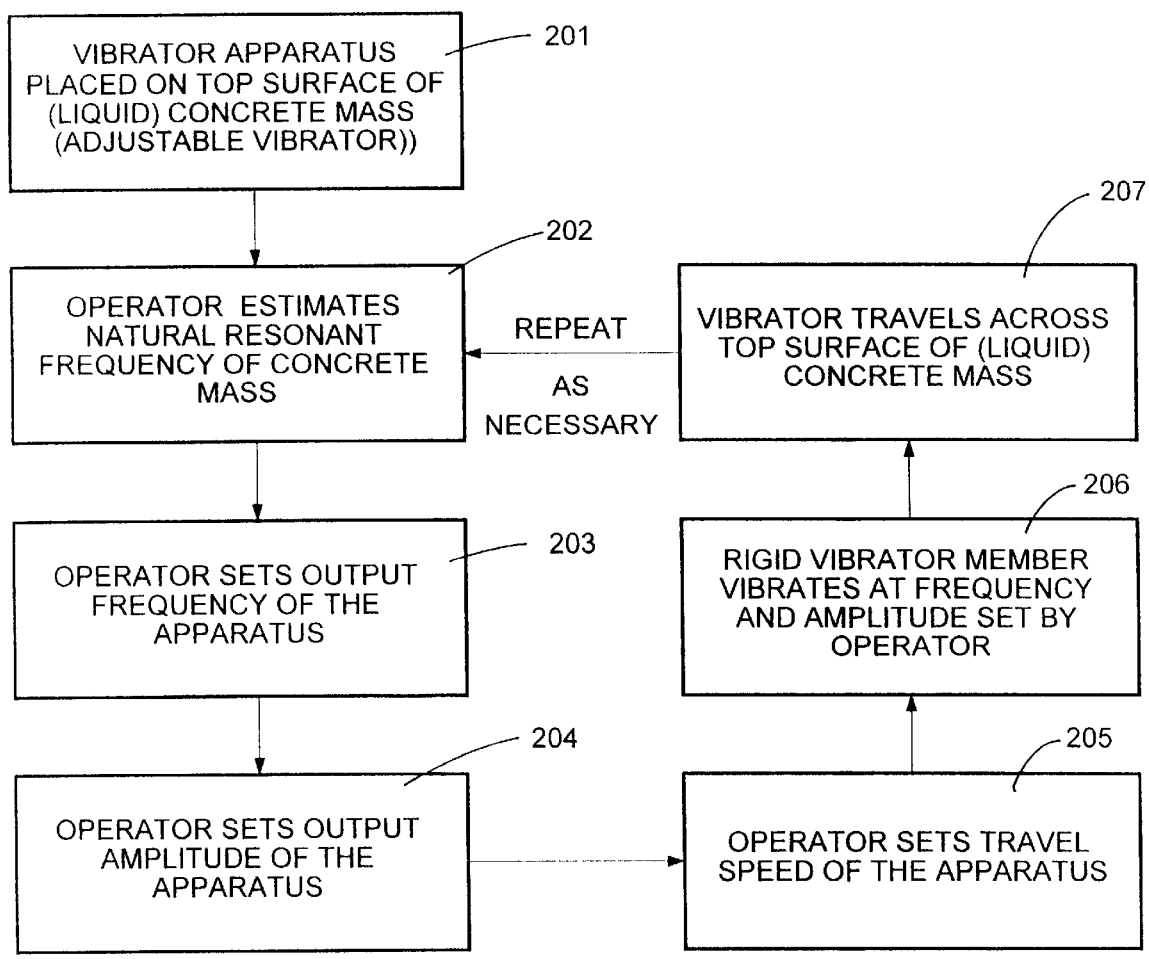
FIG. 15 is a schematic flow diagram showing a method of operating the present invention in an "adjustable" mode.

Referring now to FIGS. 5 and 15: In an "adjustable mode" of practicing the present invention, a vibrator Apparatus 3 is placed 201 on the top surface of a (liquid) concrete mass M2. The Apparatus 3 has an adjustable-frequency (and adjustable amplitude) magnetostrictive actuated rigid vibrator member 82. An operator determines 202 the probable natural resonant frequency of the (liquid) concrete mass, based on tables or similar sources. The Operator then sets 203 the output frequency of the Apparatus at or near a harmonic of the determined natural resonant frequency. The Operator may then set 204 the output amplitude of the Apparatus, based on the thickness of the (liquid) concrete mass and/or other properties. The Operator also may set 205 the travel speed of the Apparatus, based on the thickness of the (liquid) concrete mass and/or other properties. The vibrator Apparatus 3 then travels 206 across the surface of the (liquid) concrete mass.

Figure 16:
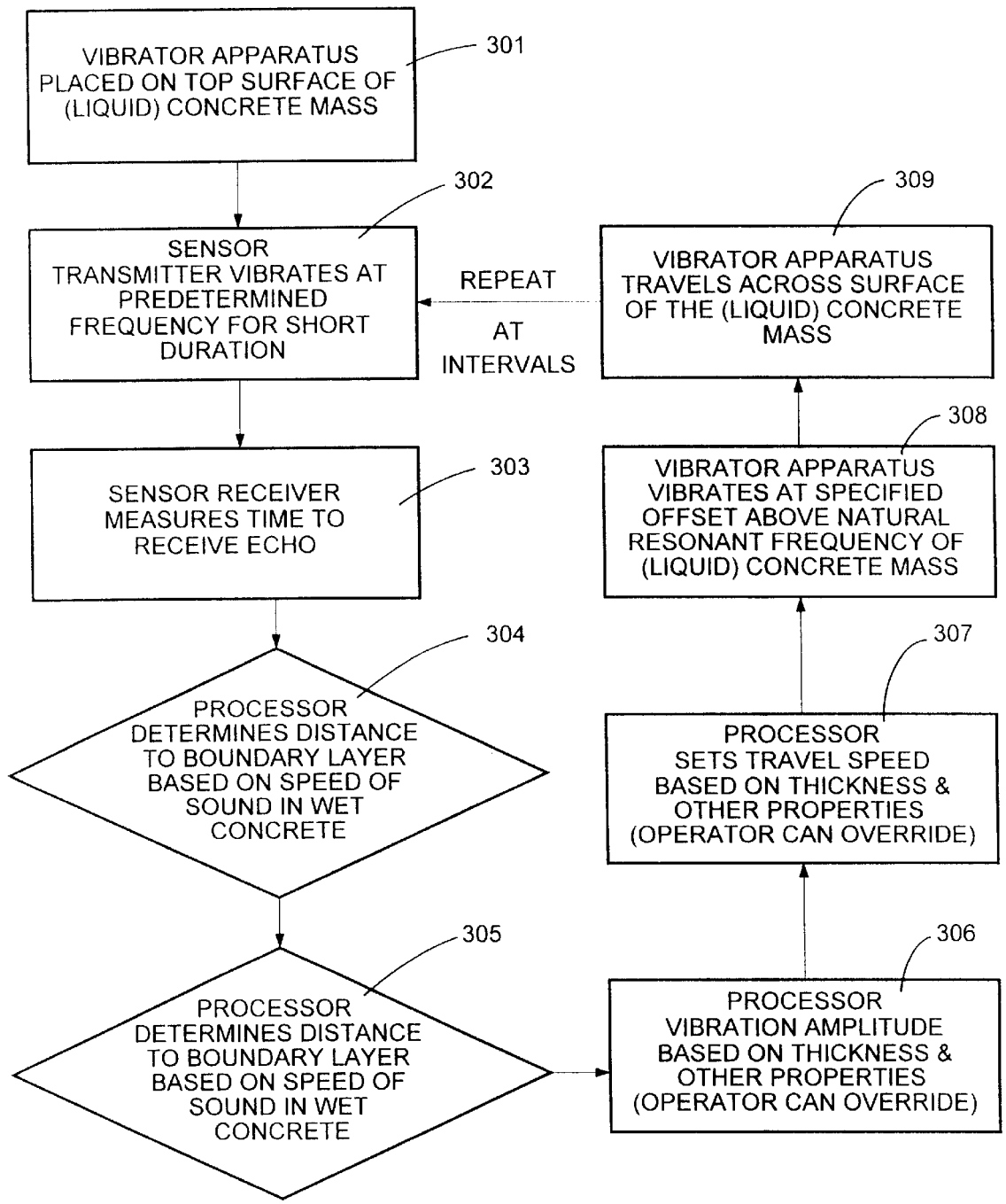
FIG. 16 is a schematic flow diagram showing a method of operating the present invention in a "boundary layer" mode.

Referring now to FIGS. 5 and 16: The invention may also be practiced in what may be described as a "boundary layer" mode, as illustrated in FIG. 16. In this method of practicing the present invention a vibrator Apparatus 3 comprising a sensor 5 in communication with a processor unit 6 determines the depth of the transition zone L, and the electronic adjustment circuitry 96 adjusts the output of the rigid vibrator member 82 to the optimal frequency and amplitude. As illustrated in FIG. 16, a vibrator Apparatus 3 is placed 301 on the top surface of the (liquid) concrete mass. A sensor 5, (which in actuality may be a transmitter/receiver), vibrates 302 at a predetermined frequency for a short duration. The sensor 5 then measures 303 the time to receive the echo. A processor unit 6 determines 304 the distance to the transition zone L, based upon the speed of sound in concrete, and then the processor unit 6 estimates 305 the natural resonant frequency from empirical data. The electronic adjustment circuitry 96 then sets 306 the vibration amplitude, based on the thickness and other properties of the (liquid) concrete mass. The electronic adjustment circuitry 96 may then set 307 the travel speed of the Apparatus, based on the thickness and other properties of the (liquid) concrete mass. The Apparatus 3 then vibrates 308 at a specified offset above the natural resonant frequency of the (liquid) concrete mass; and the vibrator Apparatus travels 309 across the surface of the (liquid) concrete mass. The amplitude and frequency of vibration and the speed of travel of the vibrator Apparatus may be continuously adjusted as the Apparatus 3 travels across the (liquid) concrete mass M2.

The sensor 5 may, alternatively, vibrate 302a at various frequencies (i.e. may sweep). The sensor 5 measures 303a the amplitude of the echo at various frequencies. The processor unit 6 determines 304a multiple points of resonance at different frequencies, and then the processor unit 6 determines 305a the natural resonant frequency of the (liquid) concrete mass, based on the difference between harmonic frequencies.

Figure 17A:
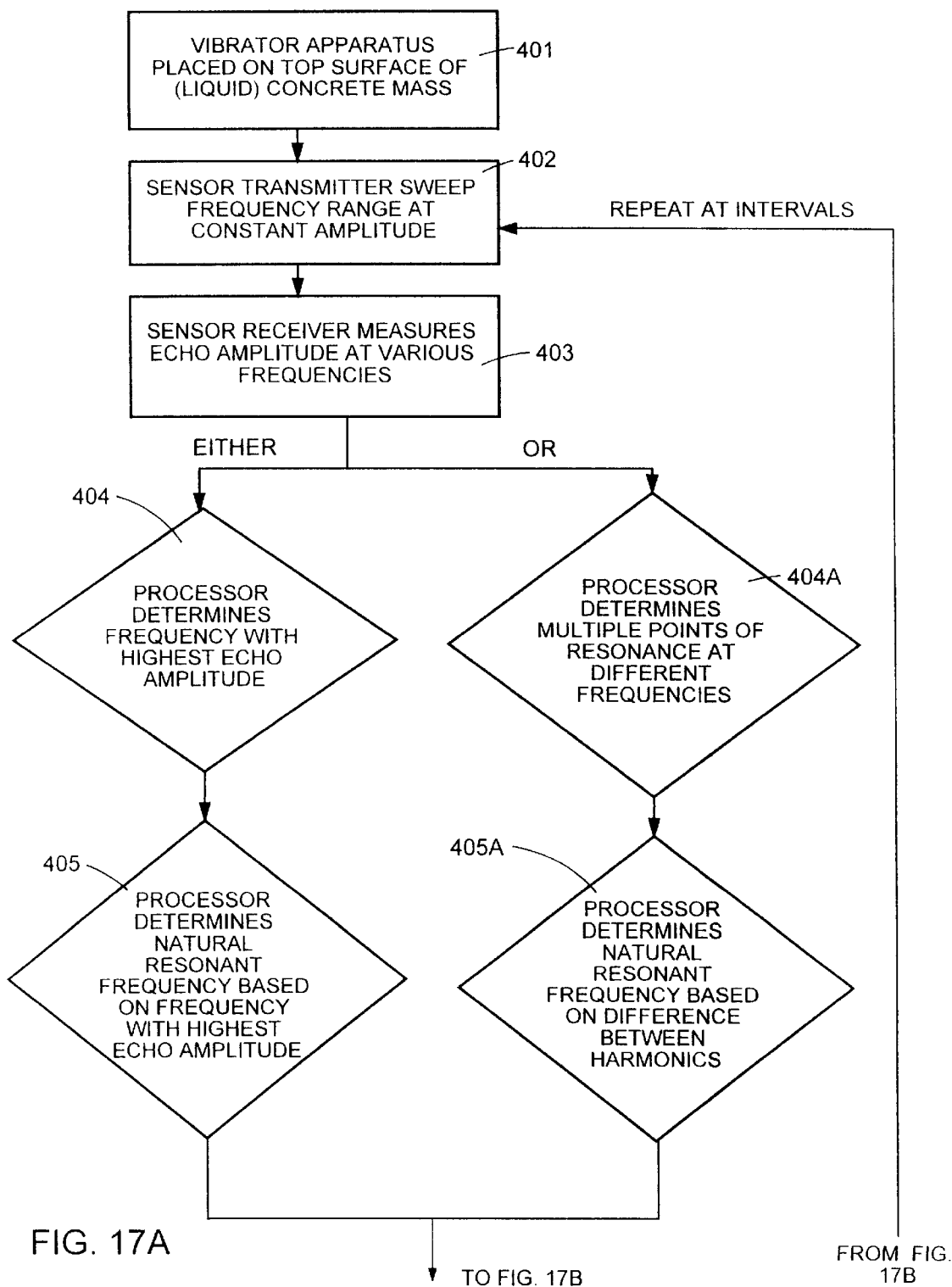
FIGS. 17A and 17B are a schematic flow diagram showing a method of operating the present invention in a "pinger" mode.
Figure 17B:
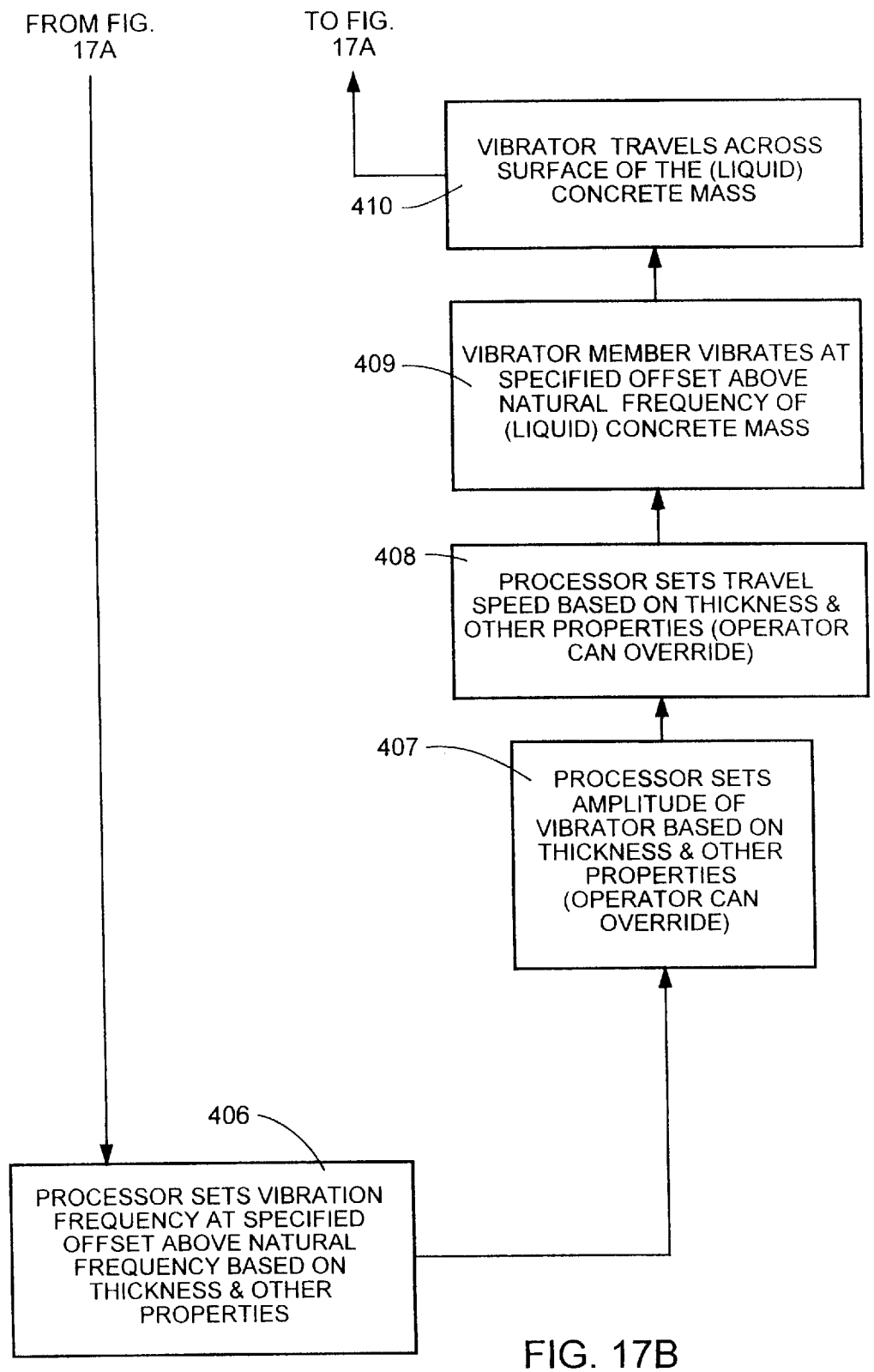

Referring now to FIGS. 12 17A and 17B: The preferred embodiment of the invention may be operated in what may be termed a "pinger mode", as illustrated in FIG. 17A and 17B. The vibrator Apparatus 3b is placed 401 on the top surface of the (liquid) concrete mass M2 with a first magnetostrictive actuated vibrator member 82 and a second magnetostrictive actuated vibrator member 10 each in contact with the (liquid) concrete mass M2. The second magnetostrictive actuated vibrator member 10 sweeps 402 across a frequency range at constant amplitude. The sensor 5 then measures 403 the echo amplitude at various frequencies. The processor unit 6b determines 404 the frequency with the highest echo amplitude, (which corresponds to the natural resonant frequency of the (liquid) concrete mass M2). The electronic adjustment circuitry 96 then sets 405 the vibration amplitude of the first magnetostrictive actuated vibrator member 82, based on the thickness and other properties of the (liquid) concrete mass. The first vibrator member 82 then vibrates 407 at a specified offset above the natural resonant frequency of the (liquid) concrete mass; and the vibrator Apparatus 3b travels 408 across the surface of the (liquid) concrete mass. The amplitude and frequency of vibration and the speed of travel of the vibrator Apparatus 3b may be continuously adjusted as the Apparatus travels across the (liquid) concrete mass M2.

Figure 18:
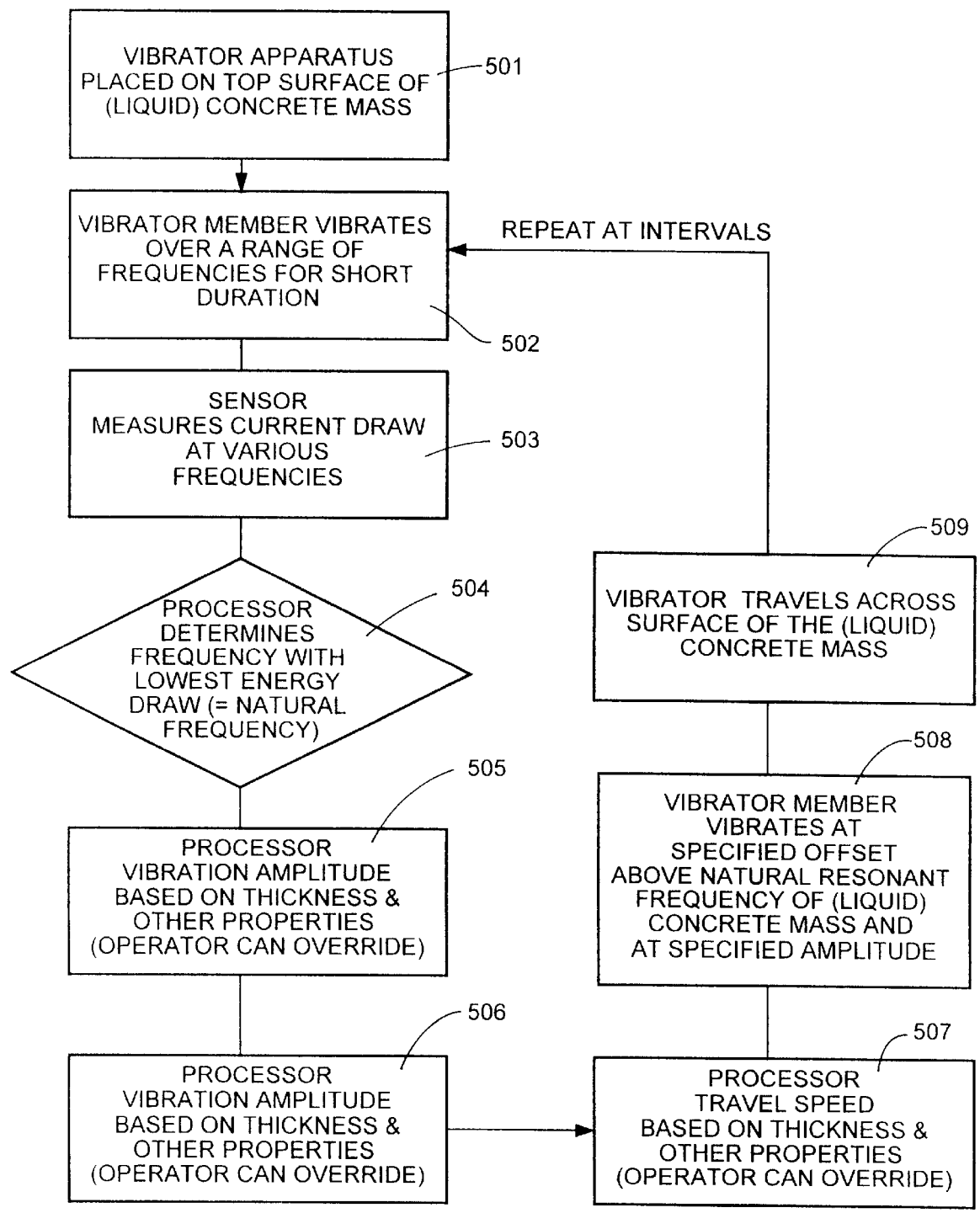
FIG. 18 is a schematic flow diagram showing a method of operating the present invention in an "ammeter" mode; and, FIG. 19 is a schematic cross-sectional elevation showing a plurality of vibrator apparatuses constructed in accordance with the present invention secured to each other.

Referring now to FIGS. 13 and 18: The method of practicing the embodiment of the present invention which is illustrated in FIGS. 13 and 18 may be referred to as the "ammeter mode". The vibrator Apparatus 3a is placed 501 on the top surface of the (liquid) concrete mass M2. The magnetostrictive actuated rigid vibrator member 82 vibrates 502 over a range of frequencies for a short duration. A sensor, which essentially comprises an ammeter within the processor unit 6a, measures 503 the current draw of the magnetostrictive actuator 81 at various frequencies. The processor unit 6a determines 504 the frequency with the lowest current draw, (which corresponds to the natural resonant frequency of the (liquid) concrete mass M2). The electronic adjustment circuitry 96a then sets 505 the vibration amplitude of the vibrator plate 82, based on the thickness and other properties of the (liquid) concrete mass. The electronic adjustment circuitry 96 may then set 506 the travel speed of the Apparatus 3a, based on the thickness and other properties of the (liquid) concrete mass M2. The vibrator member 82 then vibrates 507 at a specified offset above the natural resonant frequency of the (liquid) concrete mass; and the Apparatus travels 508 across the surface of the (liquid) concrete mass M2. The amplitude and frequency of vibration and the speed of travel of the vibrator Apparatus 3a may be continuously adjusted as the Apparatus travels across the (liquid) concrete mass M2.

The foregoing explanation describes the application of the present invention in advantageously varying the distribution profile of the constituent ingredients of an initially wet concrete mixture. It will be understood from the foregoing explanation that the distribution profile of the water-solid content of the concrete mass varies with each stage of vibration due to the forced upward migration of the water in the relatively wet portion of the concrete mass. Although the use of the present invention to effect the redistribution of the water-solid constituent ingredients of plastic concrete has been described, modifications of the present invention may be advantageously used to redistribute constituent ingredients of mixtures other than wet concrete, including liquid-solid mixtures, liquid-liquid mixtures, gas-gas mixtures, and solid-gas mixtures (eg. suspended solids).

The present invention therefore may be similarly advantageously used to drive liquids out of liquid-solid slurries other than wet concrete. For example, by determining the natural resonant frequency of a volume of water-saturated beach sand and introducing vibrational energy into that mass at a corresponding frequency, the water can be driven out of the work volume of the water-sand mixture in a controlled and energy efficient fashion. It will be understood that as the water is driven out the lower elevations of the water-sand mixture, the "work volume" (i.e. the relatively "wet" portion of the mass, corresponding to mass M2 in the above disclosure) continuously decreases, and, typically, the natural resonant frequency of that portion of the mass correspondingly changes. In the manner disclosed above, the local natural resonant frequency (or a condition indicative of same) of the work volume (eg. mass M2) is periodically sensed, and the output frequency of vibrator apparatus 3 is varied accordingly. In this manner such an initially water-saturated beach area may be made to become dry, may be made to become of substantially uniform density, and, for the reasons described above with respect to concrete placement, may be made to become of a density greater than that which would typically be achieved by natural (i.e. gravity) dewatering of the beach.

It will be appreciated that in a similar manner, virtually any other liquid may be driven from any other solid-liquid mixture in a controlled manner so as to produce a uniformly dry, uniformly dense mass. It will also be understood that, rather than viewing the liquid ingredient as being driven from (eg. upwardly out of) the mixture, one could, in a sense, also view the solid ingredient as being driven from (eg. downwardly out of) the mixture. Thus it will be appreciated that the present invention provides an apparatus and method for advantageously separating constituent ingredients of mixtures, and that such separation of constituent ingredients may be accomplished in accordance with the present invention without undesirable heating of the mixture and without the use of filtering elements such as screens and the like. Accordingly, it will be understood that the present invention may be practiced to facilitate decantation/separation of liquid-liquid mixtures; to facilitate filtering of solids out of solid-liquid mixtures; to facilitate thickening food (eg. by controlled removal of water or other liquids from solid-liquid food mixtures) without undesirably heating the food; to facilitate reduction of undesirable blood clotting by removing solid components from the blood stream; to facilitate mucous removal from patients; to facilitate skimming of milk; and to facilitate removal heavy metals or other solid contaminants from motor oil and the like.

In the preferred embodiment of the invention vibrational energy is introduced a liquid-solid mass by a vibrator apparatus which is supported above, and is in contact with, a free surface (i.e. the top surface) of the liquid-solid mass, and which vibrator apparatus introduces energy into spaced apart regions of the mass by physically travelling across the free surface of the mass. However, it is also within the scope of the present invention to introduce vibrational energy into a fluid mixture by moving the fluid mixture rather than moving the vibrating apparatus; and it is also within the scope of the invention to introduce vibrational energy into the fluid mixture other than at a free surface of the mixture.

The foregoing is considered as illustrative only of the principles of the invention. Many other variations are possible, for example:

The frequency of the vibrations introduced by the vibrator Apparatus may be harmonics of the natural resonant frequency of the (liquid) concrete mass M2, rather than at the actual natural resonant frequency; and, The processor unit 6 (or 6a) may be remote from the rigid frame 80;

The frame 80 need not be in contact with the concrete mass M, but may be supported (foe example by the rail system 93) above the surface of the concrete mass;

The rigid vibrator member 82 may be in contact with the surface of the liquid concrete mass, or may it may be in contact with the liquid concrete mass M2 beneath the top surface 1 of the concrete slab;

The vibrator member 82 may be of various shapes (including rods, bars, plates, etc.);

The vibrator member may utilize piezoelectric, electromagnetic, or magnetostrictive elements or it may be electrically powered (for example by rotary or reciprocating motor), or driven by internal or external combustion engines, or other means; and Because the resonant frequency for the wet concrete mass changes from a (lower) first frequency to a (higher) second frequency during each pass of the vibrator, it may be desirable to set the frequency of the vibrator Apparatus at an intermediate frequency between the first and second frequency during any given pass of the vibrator Apparatus.

Further, since numerous modifications and changes will readily occur to those skilled in the art, it is not desired to limit the invention to the exact construction and operation shown and described, and, accordingly, all suitable modifications and equivalents may be resorted to, falling within the scope of the invention. Accordingly, the scope of the invention should be determined not by the embodiment illustrated, but by the appended claims and their legal equivalents.

We claim:

1. A method of separating constituent ingredients of a mixture, wherein one of said ingredients is a fluid and one of said ingredients is a solid, and wherein said mixture extends between horizontally spaced apart first and second regions, comprising the following steps:

vertically oscillating a linear oscillator member at a first frequency;

introducing into a first region of said mixture a first series of vibrations at said first frequency from said oscillator member;

said first series of vibrations causing accelerated upward migration of a fluid ingredient of said mixture to provide a first segment of said mixture within said first region of said mixture located beneath the oscillator member to contain a relatively higher concentration of said fluid ingredient than a second segment of said mixture within said first region of said mixture located beneath said first segment of said mixture;

said first segment of said mixture and said second segment of said mixture being separated by a manipulatable definable boundary layer disposed between said first segment of said mixture and said second segment of said mixture;

subsequent to said step of introducing into said first region of said mixture a first series of vibrations at said first frequency from said oscillator member, sensing a resonant frequency indicative condition of the first segment of said mixture;

adjusting the frequency of vertically oscillating said linear oscillator member from said first frequency to a second frequency in response to a sensed condition of the mixture;

subsequent to said step of adjusting the frequency of vertically oscillating said linear oscillator member from said first frequency to a second frequency, introducing into said first segment of said mixture, a second series of vibrations at said second frequency from said oscillator member;

said second series of vibrations continuing the accelerated upward migration of said fluid ingredient of said mixture and reducing the size of said first segment and increasing the size of said second segment;

wherein said steps of introducing into said first region of said mixture said first series of vibrations and introducing into said first segment of said mixture said second series of vibrations separates said fluid ingredient from a solid ingredient of said mixture in said first region.

2. The method according to claim 1, wherein said step of vertically oscillating a linear oscillator member at a first frequency comprises electrically actuating a magnetostrictive element;

and wherein said step of vertically oscillating a linear oscillator member at a second frequency comprises electrically actuating a magnetostrictive element.

3. The method according to claim 2, wherein said second frequency is greater than 30,000 cycles per minute.

4. The method according to claim 3, further comprising:

horizontally moving said oscillating member relative to said mixture from said first region to said second region;

vertically oscillating said linear oscillator member at a third frequency;

introducing into said second region of said mixture a third series of vibrations at said third frequency from said oscillator member;

said third series of vibrations causing accelerated upward migration of said fluid ingredient of said mixture to provide a third segment of said mixture within said second region of said mixture located beneath the oscillator member to contain a relatively higher concentration of said fluid ingredient than a fourth segment of said mixture within said second region of said mixture located beneath said third segment of said mixture;

said third segment of said mixture and said fourth segment of said mixture being separated by an extension of said manipulatable definable boundary layer, wherein said manipulatable definable boundary layer has a higher acoustic impedance than said third segment of said mixture;

subsequent to said step of introducing into said second region of said mixture region a third series of vibrations at said third frequency from said oscillator member, sensing a resonant frequency indicative condition of the third segment of said mixture;

adjusting the frequency of vertically oscillating said linear oscillator member from said third frequency to a fourth frequency in response to a sensed condition of the mixture;

subsequent to said step of adjusting the frequency of vertically oscillating said linear oscillator member from said third frequency to a fourth frequency, introducing into said third segment of said mixture, a fourth series of vibrations at said fourth frequency from said oscillator member;

said fourth series of vibrations continuing the accelerated upward migration of said fluid ingredient of said mixture and reducing the size of said third segment and increasing the size of said fourth segment.

5. The method according to claim 4, wherein said step of vertically oscillating said linear oscillator member at a third frequency comprises electrically actuating a magnetostrictive element;

and wherein said step of vertically oscillating said linear oscillator member at a fourth frequency comprises electrically actuating a magnetostrictive element.

6. The method according to claim 5, wherein said fourth frequency is greater than 30,000 cycles per minute.

7. The method according to claim 6, wherein said second frequency corresponds to harmonic of a natural resonant frequency of said first segment of said mixture subsequent to said step of introducing into a first region of said mixture a first series of vibrations at said first frequency from said oscillator member.

8. The method according to claim 7, wherein said fourth frequency corresponds to harmonic of a natural resonant frequency of said third segment of said mixture subsequent to said step of introducing into a second region of said mixture a third series of vibrations at said third frequency from said oscillator member.

\* \* \* \* \*